United States Patent
Tsukagoshi

(10) Patent No.: US 10,356,450 B2
(45) Date of Patent: Jul. 16, 2019

(54) ENCODING DEVICE, TRANSMISSION DEVICE, AND RECEPTION DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/898,964

(22) PCT Filed: Aug. 8, 2014

(86) PCT No.: PCT/JP2014/071112
§ 371 (c)(1),
(2) Date: Dec. 16, 2015

(87) PCT Pub. No.: WO2015/037373
PCT Pub. Date: Mar. 19, 2015

(65) Prior Publication Data
US 2016/0373790 A1 Dec. 22, 2016

(30) Foreign Application Priority Data

Sep. 12, 2013 (JP) .................................. 2013-189332

(51) Int. Cl.
*H04N 21/234* (2011.01)
*H04N 21/236* (2011.01)
(Continued)

(52) U.S. Cl.
CPC .............. *H04N 21/236* (2013.01); *H04N 5/14* (2013.01); *H04N 5/46* (2013.01); *H04N 19/46* (2014.11);
(Continued)

(58) Field of Classification Search
CPC .... H04N 21/234; H04N 21/6379; H04N 5/46; H04N 5/14
(Continued)

(56) References Cited

U.S. PATENT DOCUMENTS 5,943,096 A * 8/1999 Choo .................... H04N 19/139
348/699
6,842,724 B1 * 1/2005 Lou ..................... H04N 21/4384
348/172
(Continued)

FOREIGN PATENT DOCUMENTS

CN 1636403 A 7/2005
CN 101076121 A 11/2007
(Continued)

OTHER PUBLICATIONS

International Search Report dated Nov. 4, 2014 in PCT/JP2014/071112 (with English language translation).
(Continued)

*Primary Examiner* — Pankaj Kumar
*Assistant Examiner* — Franklin S Andramuno
(74) *Attorney, Agent, or Firm* — Oblon, McClelland, Maier & Neustadt, L.L.P.

(57) ABSTRACT

To enable a reception side to easily secure a display continuity when video data having a frame rate switched part is distributed. Video data having a switched part from encoded image data of a first sequence to encoded image data of a second sequence having a different frame rate from the first sequence is generated. The video data is encoded in a manner that a display end timing of a last picture of the encoded image data of the first sequence is set to a same timing as a display start timing of a first picture of the encoded image data of the second sequence.

18 Claims, 23 Drawing Sheets

(51) Int. Cl.

| | | |
|---|---|---|
| *H04N 5/46* | (2006.01) | |
| *H04N 5/14* | (2006.01) | |
| *H04N 21/6379* | (2011.01) | |
| *H04N 19/70* | (2014.01) | |
| *H04N 19/46* | (2014.01) | |
| *H04N 21/43* | (2011.01) | |
| *H04N 21/44* | (2011.01) | |
| *H04N 19/172* | (2014.01) | |

(52) U.S. Cl.
CPC ........... *H04N 19/70* (2014.11); *H04N 21/234* (2013.01); *H04N 21/4307* (2013.01); *H04N 21/44* (2013.01); *H04N 21/6379* (2013.01); *H04N 19/172* (2014.11)

(58) Field of Classification Search
USPC ..................................................... 725/20, 90
See application file for complete search history.

(56) References Cited

U.S. PATENT DOCUMENTS

| | | | | |
|---|---|---|---|---|
| 2001/0026328 A1* | 10/2001 | Del Corson | ......... | H04N 19/112 348/558 |
| 2005/0163213 A1* | 7/2005 | Suzuki | ................ | H04N 19/172 375/240.01 |
| 2006/0210075 A1* | 9/2006 | LeComte | ......... | H04N 21/23608 380/200 |
| 2006/0215061 A1* | 9/2006 | Negishi | .................... | G09G 5/14 348/584 |
| 2007/0269192 A1 | 11/2007 | Sato | | |
| 2008/0232462 A1* | 9/2008 | Van Doren | .......... | H04N 19/172 375/240.01 |
| 2009/0115866 A1 | 5/2009 | Niida | | |
| 2009/0196346 A1* | 8/2009 | Zhang | .................... | H04N 19/61 375/240.03 |
| 2010/0091837 A1 | 4/2010 | Zhu et al. | | |
| 2011/0150094 A1* | 6/2011 | Wang | .................. | H04N 19/172 375/240.16 |
| 2011/0279728 A1 | 11/2011 | Niida | | |
| 2011/0317756 A1 | 12/2011 | Fukata | | |
| 2012/0026287 A1 | 2/2012 | Tsukagoshi | | |
| 2012/0134597 A1* | 5/2012 | Finch | ........................ | G06T 7/50 382/201 |
| 2013/0132462 A1* | 5/2013 | Moorer | ............. | H04N 21/2343 709/203 |

FOREIGN PATENT DOCUMENTS

| | | |
|---|---|---|
| CN | 102884804 A | 1/2013 |
| JP | 2007-312006 A | 11/2007 |
| JP | 2009-135888 A | 6/2009 |
| JP | 2011-109301 A | 6/2011 |
| JP | 2011-172164 A | 9/2011 |
| JP | 2012-10263 A | 1/2012 |
| JP | 2012-169765 A | 9/2012 |

OTHER PUBLICATIONS

Extended European Search Report dated Mar. 17, 2017 in Patent Application No. 14843529.0.
Munsi Haque et al., "On HEVC Descriptors for Temporal Sub-streams with Multiple PIDs in a MPEG-2 Transport Stream", Sony Electronics, Inc. and Sony Corp., ISO/IEC JTC1/SC29/WG11, MPEG2012/m26187, XP030054520, Jul. 2012, 6 pages.
Combined Chinese Office Action and Search Report dated Apr. 4, 2018 in Patent Application No. 2014800342420 (with English language translation), 18 pages.
Combined Chinese Office Action and Search Report dated Nov. 23, 2018 in corresponding Chinese Patent Application No. 201480034242.0 (with English Translation), 18 pages.
Office Action dated Feb. 26, 2019 in Japanese Patent Application No. 2018-084670.

* cited by examiner

FIG.5

Interface to Video stream Prefix_SEI (a)

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

(b)

| Syntax | No. of Bits | Format |
|---|---|---|
| temporal_refresh_information ( ) { | | |
| userdata_id | 16 | uimslbf |
| temporal_refresh_information_length | 8 | bslbf |
| temporal_timing_discontinuity_flag | 1 | bslbf |
| reserved | 7 | 0x7f |
| if (temporal_timing_discontinuity_flag ) { | | |
| num_unit_in_tick | 8 | |
| times_scale | 8 | |
| } | | |
| } | | |

FIG.6 semantics userdata_id (16 bits)
  ID OF PREDETERMINED USER DATA IS GIVEN temporal_refresh_information_length (8bits)
  INDICATE NUMBER OF BYTES (COUNTED FROM NEXT ELEMENT TO PRESENT ELEMENT) OF temporal_refresh_information temporal_timing_discontinuity_flag (1bit)
  FLAG INDICATING DISCONTINUITY OCCURRING IN TIME INFORMATION AND TIME STAMP num_unit_in_tick (8bits)
  NUMBER OF CLOCKS INDICATING DISPLAY PERIOD OF CORRESPONDING SLICE OR PICTURE times_scale (8bits)
  SCALING VALUE OF TIME INFORMATION

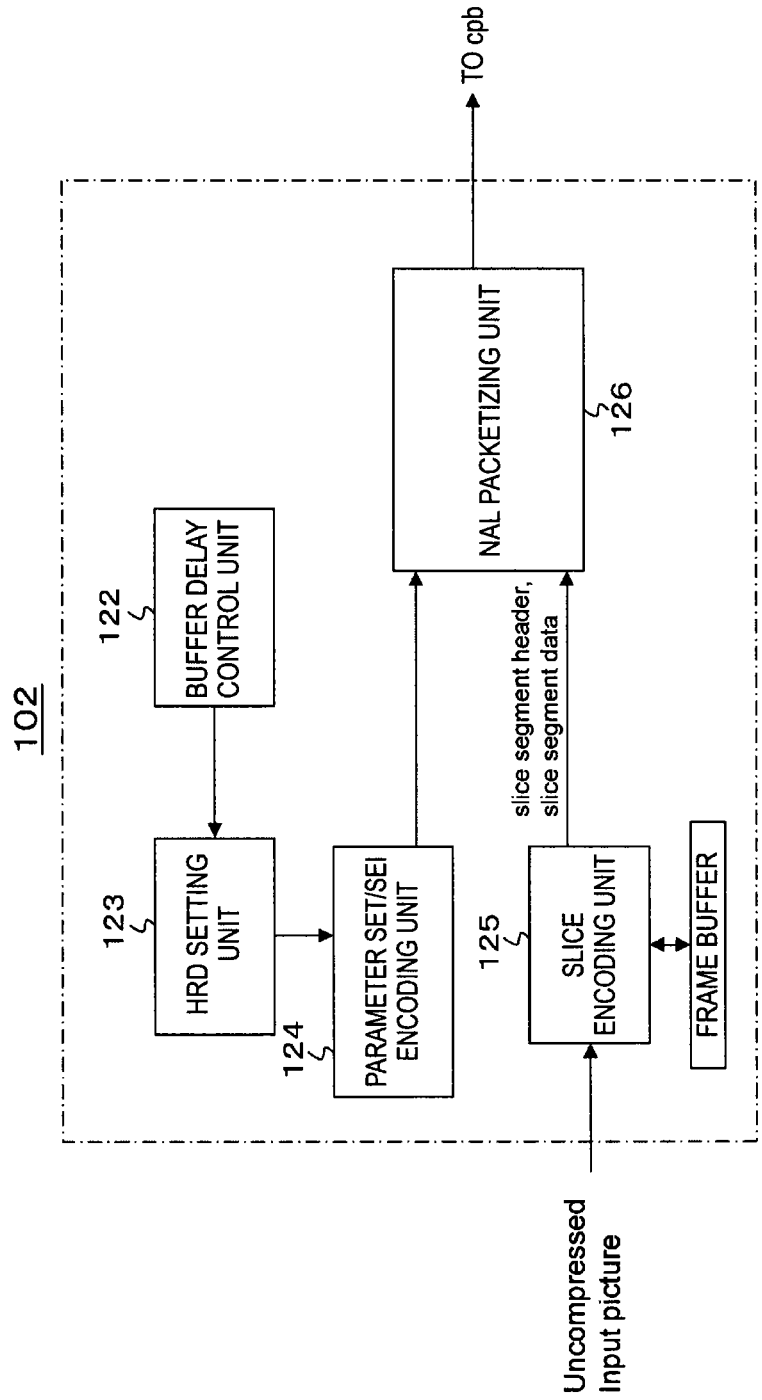

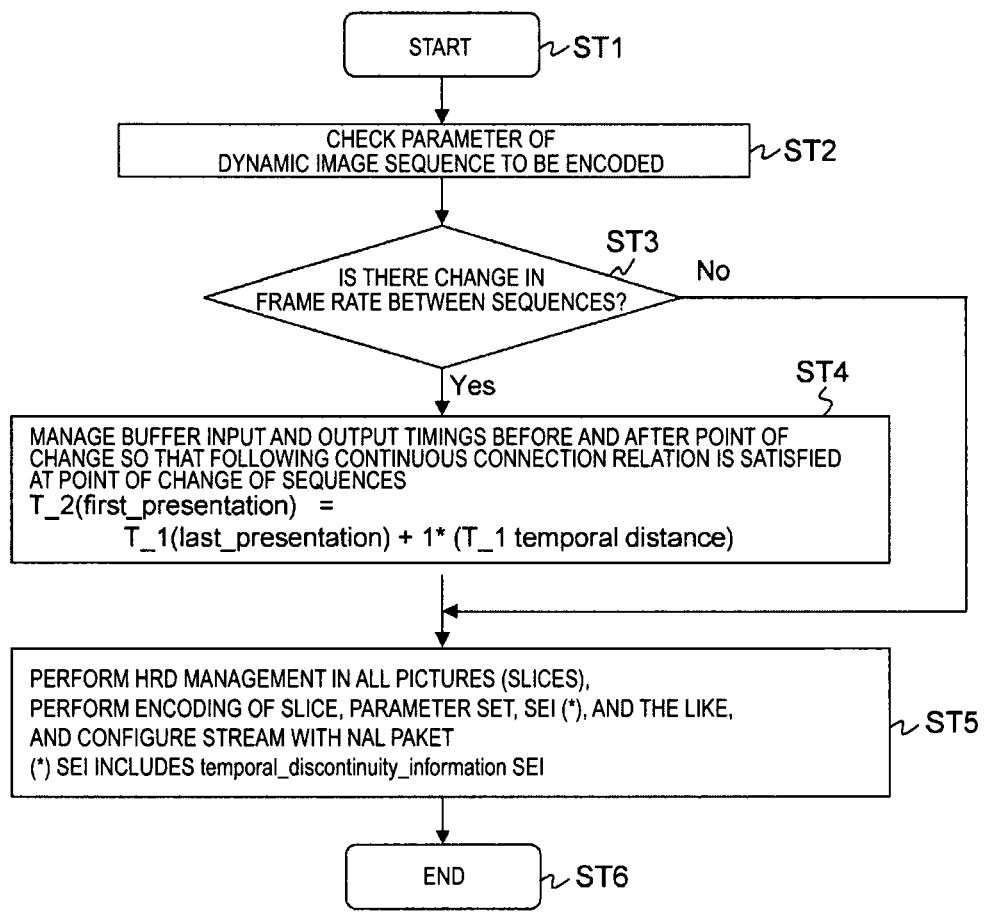

| Syntax | No. of Bits | Format |
|---|---|---|
| pes_extension_field_data (){ | | |
|   start_sync_byte | 8 | bslbf |
|   extension_field_type | 8 | bslbf |
|   data_byte | | |
| } | | |

(b)

semantics start_sync_byte (8bits)
  CODE VALUE INDICATING START OF EXTENSION FIELD
extension_field_type (8bits)
  0x01  temporal_discontinuity_information
    STRUCTURE IN WHICH INFORMATION OF TEMPORAL DISCONTINUITY OF ACCESS UNIT IS SUPPLIED
  others  reserved

FIG.10

| Syntax | No. of Bits | Format |
|---|---|---|
| temporal_discontinuity_information (){ | | |
| reserved | 6 | 0x3f |
| decode_time_discontinuity_flag | 1 | bslbf |
| presentation_frequency_change_flag | 1 | bslbf |
| if(decode_time_discontinuity_flag) | | |
| au_count_down_to_ decode_time_switching | 8 | uimsbf |
| else() | | |
| reserved | 8 | |
| if( presentation_frequency_change_flag ) | | |
| au_count_down_to_presentation_frequency_change | 8 | uimsbf |
| else() | | |
| reserved | 8 | |
| } | | |

FIG.11 semantics decode_time_discontinuity_flag (1bit)
  1    INDICATE THAT THERE IS DISCONTINUITY IN CHANGE OF VALUE OF DECODING TIME (OR DECODING TIME STAMP)
  0    INDICATE THAT THERE IS NO DISCONTINUITY IN CHANGE OF VALUE OF DECODING TIME (OR DECODING TIME STAMP)

presentation_frequency_change_flag (1bit)
  1    INDICATE THAT DISPLAY TIME INTERVAL OF ACCESS UNIT IS SWITCHED
  0    INDICATE THAT DISPLAY TIME INTERVAL OF ACCESS UNIT IS NOT SWITCHED au_count_down_to_decode_time_switching(8bits)
  0x00    INDICATE COUNT-DOWN VALUE IN UNIT OF ACCESS UNIT UNTIL DISCONTINUITY OCCURS IN CHANGE AMOUNT OF DECODING TIME
  0x01 ~ 0xFE  COUNT VALUE OF CORRESPONDING ACCESS UNIT UNTIL LAST ACCESS UNIT BEFORE POINT OF DISCONTINUITY
  0xFF    reserved au_count_down_to_presentation_frequency_change(8bits)
  0x00    INDICATE COUNT-DOWN VALUE IN UNIT OF ACCESS UNIT UNTIL DISPLAY TIME INTERVAL OF EACH ACCESS UNIT IS SWITCHED
  0x01 ~ 0xFE  COUNT VALUE OF CORRESPONDING ACCESS UNIT UNTIL LAST ACCESS UNIT BEFORE SWITCHING OF DISPLAY TIME INTERVAL
  0xFF    reserved

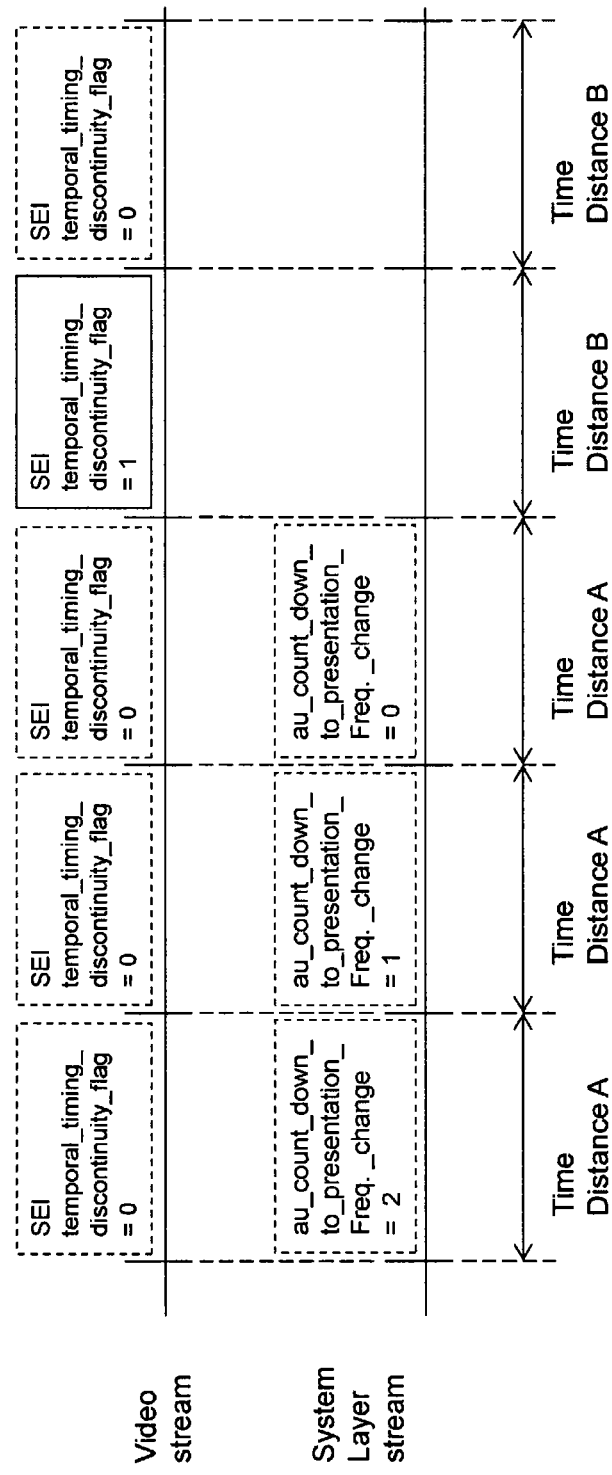

FIG.13

Video_parameter_descriptor syntax

| Syntax | No. of Bits | Format |
|---|---|---|
| Video_parameter_descriptor( ) { | | |
|     descriptor_tag | 8 | uimsbf |
|     descriptor_length | 8 | uimsbf |
|     resolution_change_flag | 1 | bslbf |
|     video_frame_rate_change_flag | 1 | bslbf |
|     video_bit_depth_change_flag | 1 | bslbf |
|     color_gamut_change_flag | 1 | bslbf |
|     dynamic_range_change_flag | 1 | bslbf |
|     video_resolution1 | 4 | uimsbf |
|     video_frame_rate1 | 4 | uimsbf |
|     video_bit_depth1 | 4 | uimsbf |
|     color_gamut1 | 4 | uimsbf |
|     luma_dynamic_range1 | 4 | uimsbf |
|     if(resolution_change_flag ) | | |
|         video_resolution2 | 4 | uimsbf |
|     if(video_frame_rate_change_flag ) | | |
|         video_frame_rate2 | 4 | uimsbf |
|     if(video_bit_depth_change_flag ) | | |
|         video_bit_depth2 | 4 | uimsbf |
|     if (color_gamut_change_flag ) | | |
|         color_gamut2 | 4 | uimsbf |
|     if(dynamic_range_change_flag) | | |
|         luma_dynamic_range2 | 4 | uimsbf |
| } | | |

FIG.14

Video_parameter_descriptor semantics

| Field | Description |
|---|---|
| descriptor_length | INDICATE SIZE OF PRESENT DESCRIPTOR (COUNTED FROM NEXT ELEMENT) |
| resolution_change_flag | INDICATE WHETHER OR NOT THERE IS CHANGE IN HORIZONTAL AND VERTICAL RESOLUTION |
| video_frame_rate_change_flag | INDICATE WHETHER OR NOT THERE IS CHANGE IN FRAME FREQUENCY (FRAME RATE) OF PICTURE |
| video_bit_depth_change_flag | INDICATE WHETHER OR NOT THERE IS CHANGE IN ENCODED BIT WIDTH |
| color_gamut_change_flag | INDICATE WHETHER OR NOT THERE IS CHANGE IN GAMUT OF ENCODED PICTURE |
| dynamic_range_change_flag | INDICATE WHETHER OR NOT THERE IS CHANGE IN RANGE OF BRIGHTNESS AND DARKNESS OF LUMINANCE |

| Field | Description |
|---|---|
| video_resolution1 (4) | HORIZONTAL AND VERTICAL RESOLUTION BEFORE CHANGE |
| video_frame_rate1 (4) | FRAME FREQUENCY OF PICTURE BEFORE CHANGE |
| video_bit_depth1 (4) | ENCODED BIT WIDTH BEFORE CHANGE |
| color_gamut1 (4) | INDICATE GAMUT OF ENCODED PICTURE BEFORE CHANGE |
| luma_dynamic_range1 (4) | INDICATE RANGE OF BRIGHTNESS AND DARKNESS OF LUMINANCE BEFORE CHANGE |

| Field | Description |
|---|---|
| video_resolution2 (4) | HORIZONTAL AND VERTICAL RESOLUTION AFTER CHANGE |
| video_frame_rate2 (4) | FRAME FREQUENCY OF PICTURE AFTER CHANGE |
| video_bit_depth2 (4) | ENCODED BIT WIDTH AFTER CHANGE |
| color_gamut2 (4) | INDICATE GAMUT OF ENCODED PICTURE AFTER CHANGE |
| luma_dynamic_range2 (4) | INDICATE RANGE OF BRIGHTNESS AND DARKNESS OF LUMINANCE AFTER CHANGE |

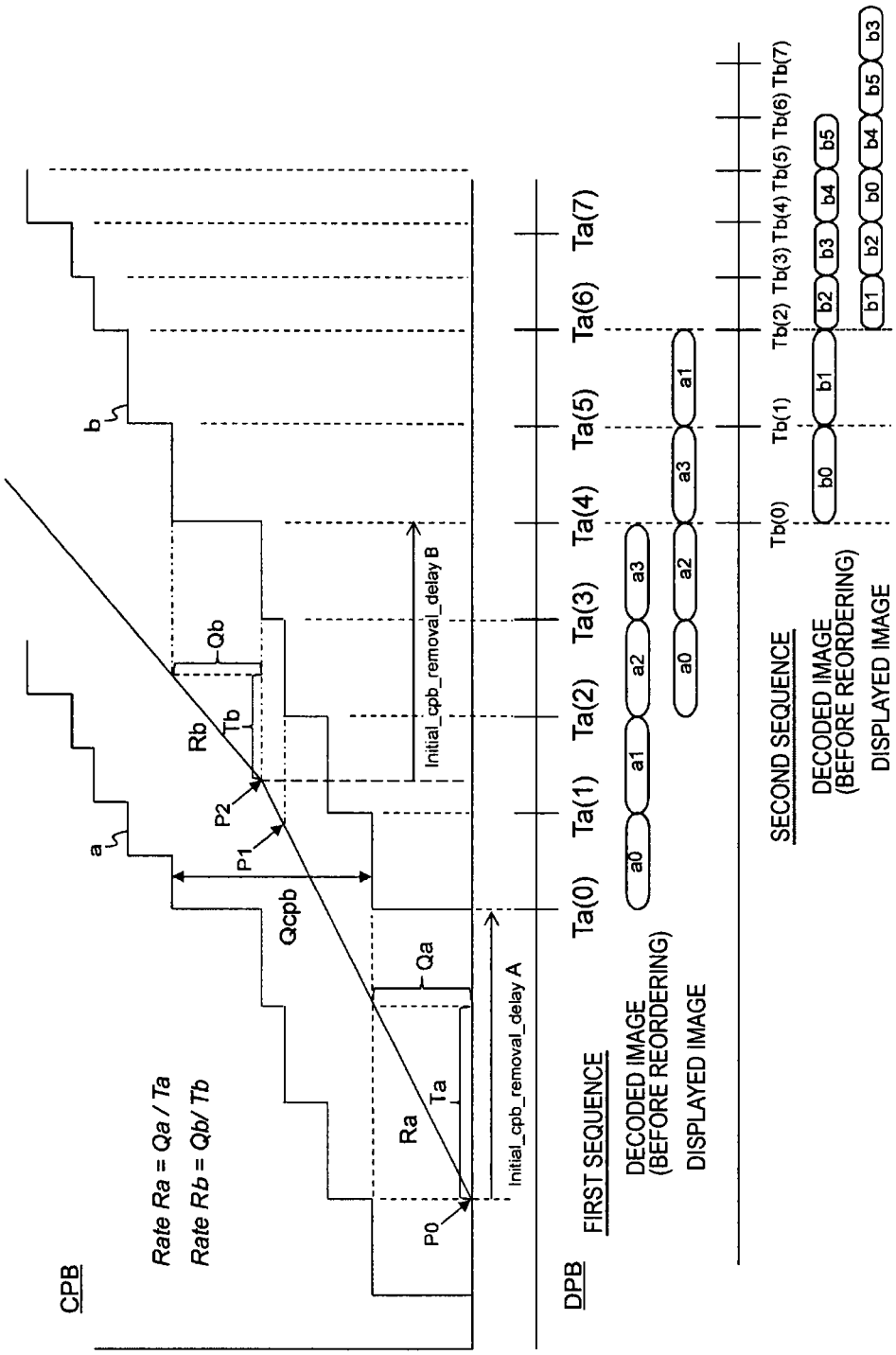

ENCODING DEVICE, TRANSMISSION DEVICE, AND RECEPTION DEVICE

TECHNICAL FIELD

The present technology relates to an encoding device, a transmission device, and a reception device, and particularly to an encoding device which generates video data having a frame rate switched part, and the like.

BACKGROUND ART

The frame rate of the current broadcasting services is set to, for example, 29.97 Hz. There is, however, a possibility that a broadcasting service adopting another frame rate will also be provided in the future (for example, refer to Patent Literature 1). In that case, a situation in which video data having a frame rate switched part in the middle of data is distributed is also considered.

CITATION LIST

Patent Literature

Patent Literature 1: JP 2011-172164A

SUMMARY OF INVENTION

Technical Problem

An objective of the present technology is, when video data having a frame rate switched part is distributed, to enable a reception side to easily secure a display continuity.

Solution to Problem

A concept of the present technology is a transmission device including: an image encoding unit configured to generate video data having a switched part from encoded image data of a first sequence to encoded image data of a second sequence having a different frame rate from the first sequence; and a transmission unit configured to transmit a container in a predetermined format which includes the generated video data. The image encoding unit performs encoding in a manner that a display end timing of a last picture of the encoded image data of the first sequence is set to a same timing as a display start timing of a first picture of the encoded image data of the second sequence.

In the present technology, video data having a switched part from encoded image data of a first sequence to encoded image data of a second sequence having a different frame rate from the first sequence is generated. In this case, in the image encoding unit, encoding is performed in a manner that a display end timing of a last picture of the encoded image data of the first sequence is set to a same timing as a display start timing of a first picture of the encoded image data of the second sequence.

The transmission unit transmits a container in a predetermined format which includes the above-described video data. The container may be, for example, a transport stream (MPEG-2 TS) that has been employed in digital broadcasting standards. In addition, the container may be, for example, MP4 that has been used in distribution on the Internet and the like, or a container in a format other than that.

In the present technology as above, encoding is performed in a manner that the display end timing of the last picture of the encoded image data of the first sequence is set to the same timing as the display start timing of the first picture of the encoded image data of the second sequence. Thus, for example, a reception side can easily secure a display continuity between the first sequence and the second sequence.

In the present technology, for example, the image encoding unit may perform encoding in a manner that the encoded image data of the first sequence and the encoded image data of the second sequence have the same number of delayed pictures from decoding until display. By performing encoding in this manner, for example, the reception side can avoid a buffer failure.

In the present technology, for example, the image encoding unit may perform encoding in a manner that a decoding timing of the first picture of the encoded image data of the second sequence is set at a timing obtained by adding a time interval of one picture of the encoded image data of the first sequence to a decoding timing of the last picture of the encoded image data of the first sequence. By performing encoding in this manner, for example, the reception side can easily secure a continuity in decoding timings of the first sequence and the second sequence, and can avoid late reading of the first picture of the second sequence well.

In the present technology, for example, an information insertion unit configured to insert information indicating whether or not there is a change in a frame rate into each piece of encoded image data of each picture of the video data may be further included. In this case, for example, when the information indicates there is a change in the frame rate, information indicating a value of the changed frame rate may be added to the foregoing information. By inserting the information in this manner, the reception side can easily ascertain the point of the change from the first sequence to the second sequence.

In the present technology, for example, an information insertion unit configured to insert information notifying of a change from the encoded image data of the first sequence to the encoded image data of the second sequence into a packet containing the video data may be further included. In this case, for example, the information insertion unit may insert the notification information into an extension field of a PES packet which includes encoded image data of each picture in its payload. By inserting the notification information in this manner, the reception side can easily ascertain the change from the first sequence to the second sequence.

In this case, for example, the notification information may include information indicating whether or not there is a discontinuity in a change of a value of a decoding time. Then, when the information indicates that there is a discontinuity, for example, the count-down value of the number of pictures until the picture at which the discontinuity has occurred may be added to the information.

In addition, in this case, for example, the notification information may include information indicating whether or not a display time interval of each picture is switched. Then, when the information indicates switching, for example, the count-down value of the number of pictures until the switching may be added to the foregoing information.

In the present technology, for example, an information insertion unit configured to insert information notifying of a change from the encoded image data of the first sequence to the encoded image data of the second sequence into a layer of the container may be further included. In this case, for example, the notification information may include information on a frame rate of the first sequence and a frame rate of the second sequence. By inserting the notification information in that manner, the reception side can easily ascertain the change from the first sequence to the second sequence.

Another concept of the present technology is a reception device including: a reception unit configured to receive a container in a predetermined format which includes video data having a switched part from encoded image data of a first sequence to encoded image data of a second sequence having a different frame rate from the first sequence. The video data is encoded in a manner that a display end timing of a last picture of the encoded image data of the first sequence is set to a same timing as a display start timing of a first picture of the encoded image data of the second sequence. The reception device further includes an image decoding unit configured to decode the video data included in the received container to obtain image data with a display continuity between the first sequence and the second sequence maintained.

In the present technology, the reception unit receives the container in the predetermined format. This container includes the video data having the switched part from the encoded image data of the first sequence to the encoded image data of the second sequence having the different frame rate from the first sequence. In addition, the image decoding unit decodes the video data included in the received container and obtains the image data with the display continuity between the first sequence and the second sequence maintained.

Here, the video data is encoded in a manner that the display end timing of the last picture of the encoded image data of the first sequence is set to the same timing as the display start timing of the first picture of the encoded image data of the second sequence. Thus, the display continuity between the first sequence and the second sequence can be easily secured.

In the present technology, for example, before the same timing, the image decoding unit may decode encoded image data of each picture of the second sequence at a timing synchronized with a decoding timing of encoded image data of each picture of the first sequence. In this case, implementation in which two asynchronous vertical synchronization signals are simultaneously generated can be avoided.

In the present technology, for example, information notifying of a change from the encoded image data of the first sequence to the encoded image data of the second sequence may be inserted into at least one of a packet containing the video data and a layer of the container. A process of the image decoding unit may be controlled based on the notification information.

Another concept of the present technology is a reception device including: a reception unit configured to receive video data having a switched part from encoded image data of a first sequence to encoded image data of a second sequence having a different frame rate from the first sequence; and a processing unit configured to process the received video data. The video data is encoded in a manner that a display end timing of a last picture of the encoded image data of the first sequence is set to a same timing as a display start timing of a first picture of the encoded image data of the second sequence.

In the present technology, the reception unit receives the video data having the switched part from the encoded image data of the first sequence to the encoded image data of the second sequence having the different frame rate from the first sequence. In addition, the processing unit processes the received video data.

In this case, the video data is encoded in a manner that the display end timing of the last picture of the encoded image data of the first sequence is set to the same timing as the display start timing of the first picture of the encoded image data of the second sequence. Accordingly, for example, a display continuity between the first sequence and the second sequence can be easily secured.

This video data may be encoded in a manner that, for example, the encoded image data of the first sequence and the encoded image data of the second sequence have the same number of delayed pictures from decoding until display. In addition, for example, the video data may be encoded in a manner that a decoding timing of the first picture of the encoded image data of the second sequence is set at the timing obtained by adding a time interval of one picture of the encoded image data of the first sequence to a decoding timing of the last picture of the encoded image data of the first sequence.

Advantageous Effects of Invention

According to the present technology, a reception side can easily secure a display continuity. It should be noted that the effects described herein are not necessarily limitative, and any effect described in the present disclosure may be exhibited.

BRIEF DESCRIPTION OF DRAWINGS

FIG. 5 is a diagram showing a structure example of an interface for inserting temporal refresh information SEI and a structure example of "temporal_refresh_information( )."

FIG. 6 is a diagram showing content of main information of the structure example of "temporal_refresh_information( )."

FIG. 7 is a block diagram showing a configuration example of an encoder.

FIG. 8 is a diagram showing an example of a process flow of the encoder.

FIG. 9 is a diagram showing a structure example of PES extension field data (pes_extension_field_data) and content of main information thereof.

FIG. 10 is a diagram showing a structure example of temporal discontinuity information "temporal_discontinuity_information( )."

FIG. 11 is a diagram showing content of main information of the structure example of temporal discontinuity information "temporal_discontinuity_information( )."

FIG. 12 is a diagram showing an example of conversion of information regarding a display continuity at the time of switching from a first sequence (sequence A) to a second sequence (sequence B).

FIG. 13 is a diagram showing a structure example of a video parameter descriptor "Video_parameter_descriptor."

FIG. 14 is a diagram showing content of main information of the structure example of the video parameter descriptor "Video_parameter_descriptor."

FIG. 24 is a diagram showing an example of HRD control of an encoder for securing a display continuity and decoding continuity.

DESCRIPTION OF EMBODIMENTS

Hereinafter, embodiments for implementing this technology (hereinafter referred to as "embodiments") will be described. Note that description will be provided in the following order.
1. Embodiment
2. Modified example
<1. Embodiment>
[Transmission and Reception System]

Figure 1:
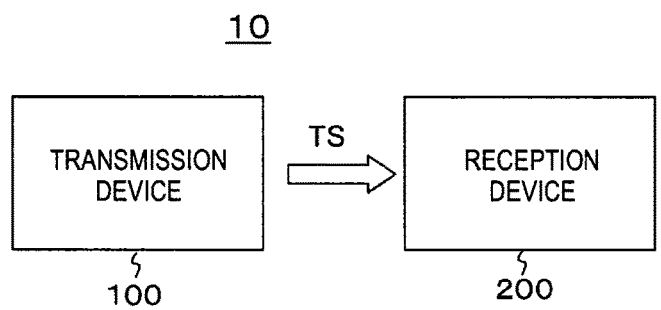
FIG. 1 is a block diagram showing a configuration example of a transmission and reception system of an embodiment.

FIG. 1 shows a configuration example of a transmission and reception system 10 as an embodiment. This transmission and reception system 10 is configured to have a transmission device 100 and a reception device 200.

The transmission device 100 transmits a transport stream TS that is a container by causing the stream to be carried on broadcast waves. This transport stream TS includes a video stream with a frame rate switched part, i.e., a part which is switched from encoded image data of a first sequence to encoded image data of a second sequence which has a different frame rate from the first sequence.

Encoding of, for example, H.264/AVC, H.265/HEVC, or the like is assumed to be performed. Here, the encoding is performed such that the display end timing of the last picture of the encoded image data of the first sequence is set to the same timing as the display start timing of the first picture of the encoded image data of the second sequence. Accordingly, a reception side, for example, can easily secure a display continuity between the first sequence and the second sequence.

Information indicating whether or not there is a change in a frame rate is inserted into encoded image data of each picture of a video stream. Accordingly, the reception side can easily ascertain, for example, the point of the change from the first sequence to the second sequence.

In addition, information notifying of a change from the encoded image data of the first sequence to the encoded image data of the second sequence is inserted into a packet containing the video stream, for example, into a PES packet. In addition, the information notifying of the change from the encoded image data of the first sequence to the encoded image data of the second sequence is inserted in a layer of the container, i.e., a layer of the transport stream. Accordingly, the reception side can easily ascertain, for example, the change from the first sequence to the second sequence.

The reception device 200 receives the above-described transport stream TS sent by being carried on the broadcast waves from the transmission device 100. The reception device 200 decodes the video stream included in the transport stream TS to obtain image data. As described above, the video stream is encoded such that the display end timing of the last picture of the encoded image data of the first sequence is set to the same timing as the display start timing of the first picture of the encoded image data of the second sequence. Thus, image data with display continuity between the first sequence and the second sequence maintained is obtained.

Here, the information notifying of the change from the encoded image data of the first sequence to the encoded image data of the second sequence is inserted into at least one of the packet containing the video stream and the layer of the container. An image decoding process is controlled based on this notification information. For example, the switched part from the first sequence to the second sequence is ascertained based on this notification information, and switching from a vertical synchronization signal synchronized with the encoded image data of the first sequence to a vertical synchronization signal synchronized with the encoded image data of the second sequence is performed.

In addition, encoded image data of each picture of the second sequence is decoded at a timing synchronized with a decoding timing of encoded image data of each picture of the first sequence before the above-described same timing. Accordingly, for example, implementation in which two asynchronous vertical synchronization signals are simultaneously generated can be avoided.

[Configuration of Transmission Device]

Figure 2:
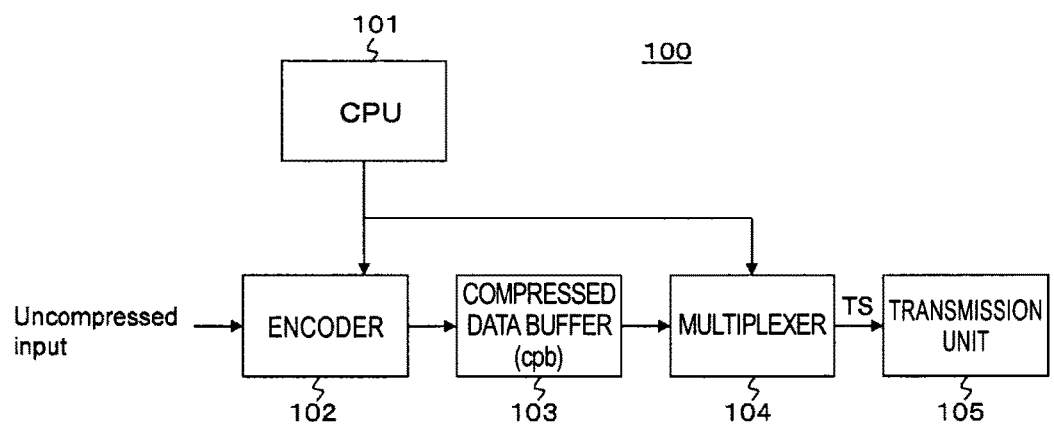
FIG. 2 is a block diagram showing a configuration example of a transmission device.

FIG. 2 shows a configuration example of the transmission device 100. This transmission device 100 has a central processing unit (CPU) 101, an encoder 102, a compressed data buffer (coded picture buffer or cpb) 103, a multiplexer 104, and a transmission unit 105. The CPU 101 is a control unit, which controls operations of each unit of the transmission device 100.

The encoder 102 receives an input of uncompressed image data and performs encoding thereon. The encoder 102 performs encoding in, for example, H.264/AVC, H.265/HEVC, or the like. In this embodiment, uncompressed image data with a different frame rate is input to the encoder 102 in a switching manner. Thus, the encoder 102 generates video streams (video data) with a frame rate switched part i.e., a part which is switched from the encoded image data of the first sequence to the encoded image data of the second sequence having a different frame rate.

Here, the encoder 102 performs the encoding such that the display end timing of the last picture of the encoded image data of the first sequence is set to the same timing as the display start timing of the first picture of the encoded image data of the second sequence.

Figure 3:
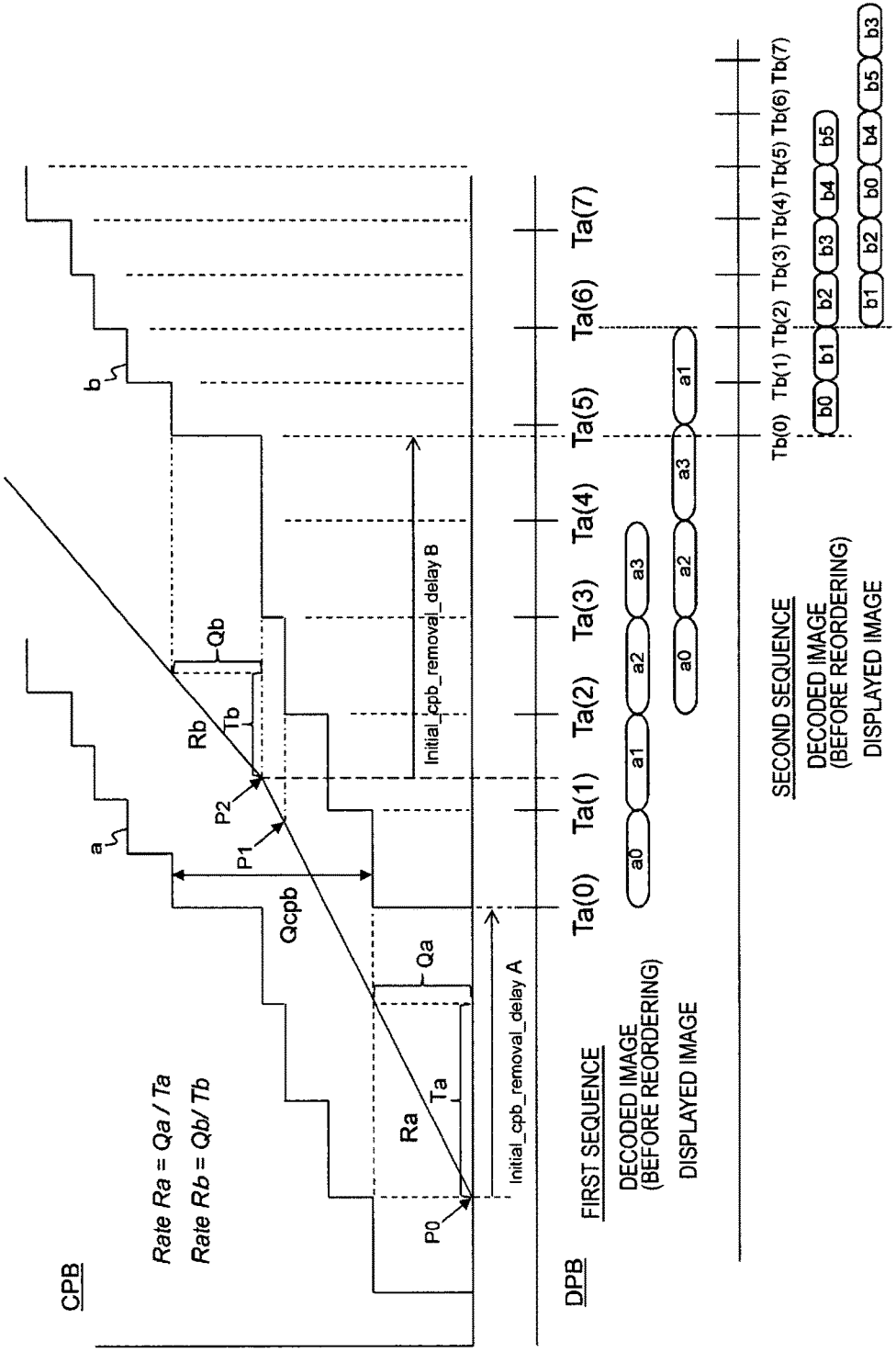
FIG. 3 is a diagram showing an example of HRD control of an encoder for securing a display continuity.

FIG. 3 shows an example of Hypothetical Reference Decoder (HRD) control of the encoder 102. A staircase-like solid line a represents progress of the amount of data generated in encoding, and each step corresponds to the unit of one picture. The height of each step represents an amount of data generated in encoding.

A timing P0 indicates a timing at which the first byte of encoded image data of the first picture of the first sequence (sequence A) enters a coded picture buffer (cpd or compressed data buffer). A timing P1 indicates a timing at which the first byte of the encoded image data of the last picture of the first sequence enters the cpd. A timing P2 indicates a timing at which the last byte of the encoded image data of the last picture of the first sequence enters the cpd and the first byte of the encoded image data of the first picture of the second sequence (sequence B) enters the cpd.

In addition, Ra indicates an input bit rate of the encoded image data of the first picture of the first sequence to the cpd. Here, when the amount of data of the encoded image data of the first picture of the first sequence is set to Qa and the data is assumed to be input into the cpd for a time Ta, Ra=Qa/Ta. In the illustrated example, a case in which an input bit rate of encoded image data of other pictures of the first sequence to the cpd is also set to Ra is shown.

In addition, Rb indicates an input bit rate of the encoded image data of the first picture of the second sequence to the cpd. Here, when the amount of data of the encoded image data of the first picture of the second sequence is set to Qb and the data is assumed to be input into the cpd for a time Tb, Rb=Qb/Tb. In the illustrated example, a case in which an input bit rate of encoded image data of other pictures of the second sequence to the cpd is also set to Rb is shown. It should be noted that, although Ra and Rb show an example of a constant bit rate (constant_bit_rate), they are not limited thereto, and the same approach is applied to the case of a variable bit rate (variable_bit_rate).

A staircase-like solid line b represents progress of the amount of data consumed in decoding, and each step corresponds to the unit of one picture. The height of each step represents the amount of data consumed in decoding. Qcpb represents an occupation amount of the cpd. Encoding is performed such that the occupation amount fits within a size of the cpb (memory capacity) at any timing.

In the illustrated example, the first sequence is composed of 4 pictures, which are decoded in the order of a0, a1, a2, and a3 and displayed in the order of a0, a2, a3, and a1. In this case, image data of each of the decoded pictures is input to a decoded picture buffer (dpb or uncompressed data buffer). In this example, the number of delayed pictures after the first sequence is decoded until display thereof is started is set to 2.

Each of the pictures of the first sequence is decoded and displayed at a timing of a vertical synchronization signal (Vsync) with a time interval corresponding to a frame rate (frame frequency) thereof. For example, the pictures a0, a1, a2, and a3 are decoded at the timings Ta(0), Ta(1), Ta(2), and Ta(3), and display of the pictures a0, a2, a3, and a1 is started at the timings Ta(2), Ta(3), Ta(4), and Ta(5).

The second sequence is composed of 6 pictures, which are decoded in the order of b0, b1, b2, b3, b4, and b5, and displayed in the order of b1, b2, b0, b4, b5, and b3. In this case, encoded data of each of the decoded pictures is input to the dpb. In this example, the number of delayed pictures after the second sequence is decoded until display thereof is started is set to 2, the same as the first sequence. Accordingly, a buffer failure is avoided.

Each of the pictures of the second sequence is decoded and displayed at the timing of the vertical synchronization signal (Vsync) with a time interval corresponding to a frame rate (frame frequency) thereof. For example, the pictures b0, b1, b2, b3, b4, and b5 are decoded at the timings Tb(0), Tb(1), Tb(2), Tb(3), Tb(4), and Tb(5) and display of the pictures b1, b2, b0, b4, b5, and b3 is started at the timings Tb(2), Tb(3), Tb(4), Tb(5), Tb(6), and Tb(7).

In this example, the display end timing of the last picture of the first sequence becomes the same as the display start timing of the first picture of the second sequence. That is, the timing Ta(6) is set to the same timing as the timing Tb(2). Accordingly, a display continuity between the first sequence and the second sequence is ensured.

At this time, the timing (Tb(0)) at which the first picture of the second sequence is decoded is a timing delayed "Initial_cpb_removal_delay B" from a timing (P2) at which the leading byte of the first picture of the second sequence starts accumulating in the compressed data buffer (cpb). If the timing (Tb(0)) is set to be later than the timing (Ta(4)), late reading of the first picture of the second sequence is avoided.

Figure 4:
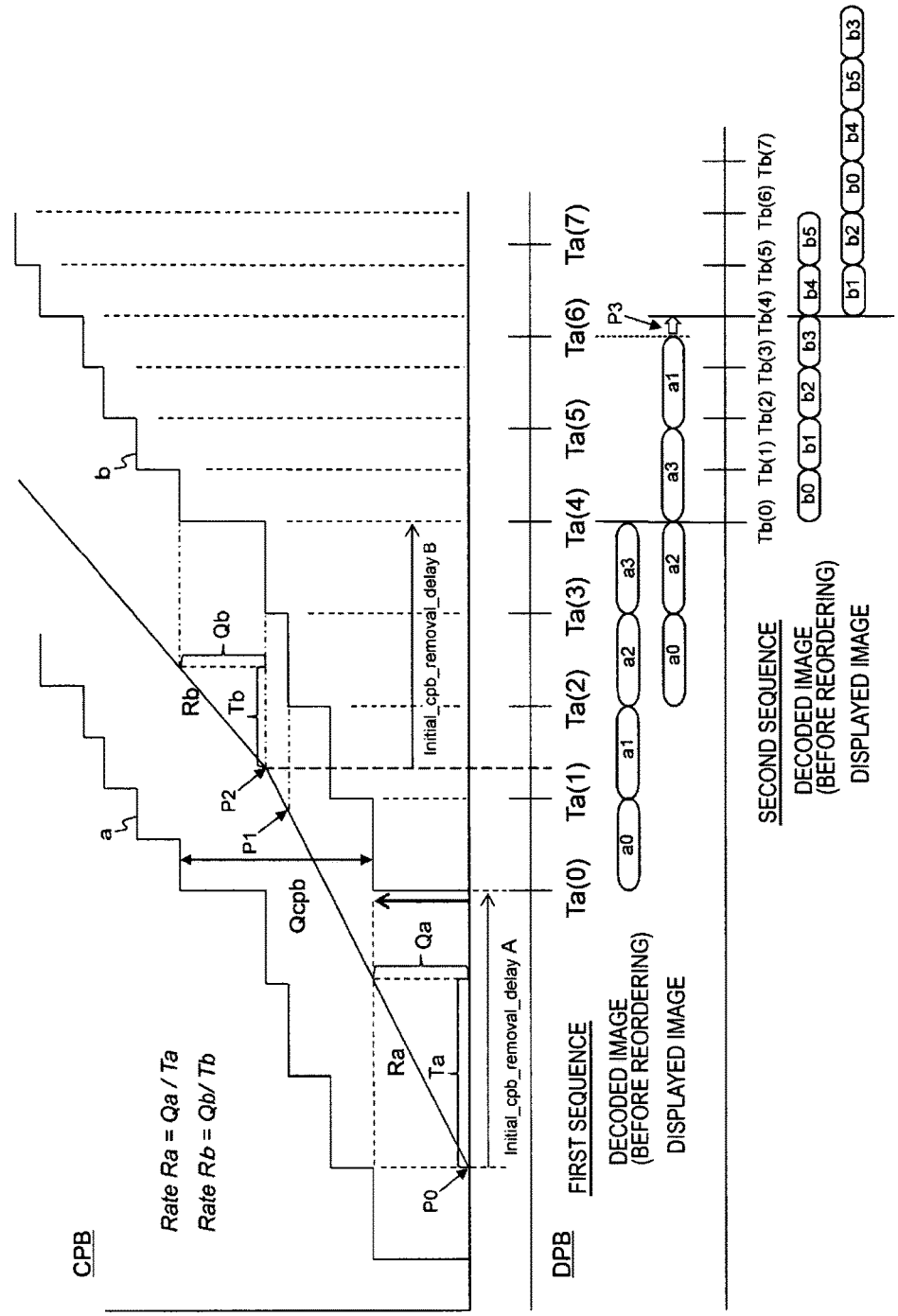
FIG. 4 is a diagram showing an example of HRD control of the encoder.

FIG. 4 also shows an example of HRD control. This example is a comparison example to the above-described HRD control shown in FIG. 3. In this example, the timing (Tb(0)) at which the first picture of the second sequence is decoded is set to the same timing as the timing (Ta(4)) obtained by adding the period of one frame of the second sequence to the timing (Ta(3)) at which the last picture of the first sequence is decoded.

In this case, although a continuity in decoding timings of the first sequence and the second sequence is ensured, a continuity in display is not. In other words, the display end timing (Ta(6)) of the last picture of the first sequence deviates from the display start timing (Tb(4)) of the first picture of the second sequence. In this case, it is necessary to delay display of the last picture of the first sequence to immediately before the timing (Tb(4)) as shown by P4.

In addition, the encoder 102 inserts information indicating whether or not there is a change in the frame rate of encoded image data of each picture of the video stream. The encoder 102 inserts temporal refresh information SEI (temporal_refresh_information SEI) which newly defines that information as one of prefix SEI (Prefix_SEI).

FIG. 5(a) shows a structure example (syntax) of an interface (I/F) for inserting the temporal refresh information SEI. The field of "uuid_iso_iec_11578" has a UUID value indicated by "ISO/IEC 11578:1996 Annex A." "temporal_refresh_information( )" is inserted into the field of "user_data_payload_byte."

FIG. 5(b) shows a structure example (syntax) of "temporal_refresh_information( )." FIG. 6 shows content (semantics) of main information of the structure example. The ID of predetermined user data is given in the 16-bit field of "userdata_id." The 8-bit field of "temporal_refresh_information_length" indicates the number of bytes of "temporal_refresh_information" (counted from an element next to this element).

The 1-bit field of "temporal_timing_discontinuity_flag" is a flag indicating a discontinuity occurring in display time information and a time stamp. "1" indicates a discontinuity occurred. "0" indicates no discontinuity occurred. When the flag is "1," the 8-bit field of "num_unit_in_tick" and the 8-bit field of "times_scale" are presented.

The 8-bit field of "num_unit_in_tick" is the number of blocks indicating a display period of a corresponding slice or picture. The 8-bit field of "times_scale" indicates a time information scaling value. Here, by calculating "times_scale" and "num_unit_in_tick," a frame rate (frame frequency) can be obtained.

FIG. 7 shows a configuration example of the encoder 102. This encoder 102 has a buffer delay control unit 122, a hypothetical reference decoder (HRD) setting unit 123, a parameter set/SEI encoding unit 124, a slice encoding unit 125, and an NAL packetizing unit 126.

The buffer delay control unit 122 calculates "initial_cpb_removal_delay" which is an initial value of buffering of a sequence and "cpb_removal_delay" and "dpb_output_delay" of each picture for sequences disposed chronologically before and after switching. In this case, in order to assure a continuous connection relation of display between the two sequences, "dpb_output_delay" and "cpb_removal_delay" of the two sequences are controlled such that a dpb buffer output of the last picture of the previous sequence becomes time-serially continuous with a dpb buffer output of the first picture of the after sequence (see FIG. 3).

"Initial cpb removal time" indicates a time (initial time) taken when encoded image data of the leading picture of a Group of Pictures (GOP) from the cpb (compressed data buffer) is decoded. "cpb_removal_delay" is a time at which encoded image data of each picture is taken out from the cpb, and a time at which each picture is decoded is decided in accordance with "initial_cpb_removal_time." In addition, "dpb_output_delay" indicates a time from entering the dpb (uncompressed data buffer) to taking-out of data after the decoding.

The HRD setting unit 123 performs HRD setting based on the information of "initial cpb removal time," "cpb_removal_delay," and "dpb_output_delay" calculated by the buffer delay control unit 122. The parameter set/SEI encoding unit 124 generates SEI, in addition to parameter sets such as a video parameter set (VPS) and a sequence parameter set (SPS) based on the HRD setting or the like.

For example, picture timing SEI that includes "cpb_removal_delay" and "dpb_output_delay" is generated. In addition, for example, buffering period SEI including "initial_cpb_removal_time" is generated. In addition, for example, temporal refresh information SEI (temporal_refresh_information SEI) which elucidates a switching timing as described above is generated.

The slice encoding unit 125 obtains slice data (slice segment header and slice segment data) by encoding image data of each picture. The slice decoding unit 125 inserts "ref_idx_l0_active (ref_idx_l1_active), which indicates an index of a picture that is a prediction destination of a "prediction unit," into the "slice segment header" as information indicating a state of time direction prediction using a frame buffer. Accordingly, during decoding, a reference source picture is decided. In addition, the slice decoding unit 125 inserts the index of a current slice into the "slice segment header" as "short_term_ref_pic_set_idx" or "it_idx_sps."

The NAL packetizing unit 126 generates encoded image data of each picture based on the parameter sets and SEI generated by the parameter set/SEI encoding unit 124 and the slice data generated by the slice encoding unit 125, and outputs video streams (encoded streams).

FIG. 8 shows an example of the process flow of the encoder 102. The encoder 102 starts the process in Step ST1, and then moves to the process of Step ST2. In this Step ST2, the encoder 102 checks a parameter of a dynamic sequence to be encoded. This parameter also includes the frame rate (frame frequency).

Then, the encoder 102 determines whether or not there is a change in the frame rate in the sequence in Step ST3. When there is a change in the frame rate, the encoder 102 proceeds to the process or Step ST4. In Step ST4, the encoder manages buffer input and output timings before and after the point of the change.

In this case, the following expression (1) is satisfied.

$$T\_2(\text{first\_presentation}) = T\_1(\text{last\_presentation}) + 1 * (T\_1 \text{ temporal distance}) \quad (1)$$

Here, "T_2(first_presentation)" indicates a display start timing of the first picture of the second sequence. "T_1 (last_presentation)" indicates the display start timing of the last picture of the first sequence. "(T_1 temporal distance)" indicates the time interval between vertical synchronization signals, i.e., the frame period of the first sequence.

After the process of Step ST4, the encoder 102 proceeds to the process of Step ST5. When there is no change in the frame rate in Step ST3 described above, the encoder 102 directly moves to the process of Step 5. In this Step ST5, the encoder 102 performs HRD management in all pictures (slices), performs encoding of the slices, the parameter sets, SEI, and the like, and then configures a stream with NAL packets. Thereafter, the encoder 102 finishes the process in Step ST6.

Returning to FIG. 2, the compressed data buffer (cpb) 103 temporarily accumulates a video stream including the encoded data of each picture generated by the encoder 102. The multiplexer 104 reads the video stream accumulated in the compressed data buffer 103, makes them into PES packets, further makes them into transport packets and multiplexes them, and thereby obtains a transport stream TS as a multiplexed stream.

The multiplexer 104 inserts the information notifying of a change from the encoded image data of the first sequence to the encoded image data of the second sequence into the packet containing the video stream, for example, the PES packet. In this embodiment, in the field of a PES extension of the PES packet, temporal discontinuity information (temporal_discontinuity_information) is defined.

This temporal discontinuity information includes information indicating whether or not there is a discontinuity in a change of a value of a decoding time, and when the information indicates that there is a discontinuity, the count-down value of the number of pictures until a picture at which the discontinuity has occurred is added to that information. In addition, this temporal discontinuity information includes information indicating whether or not a display time interval of each of pictures is switched, and when the information indicates switching, the count-down value of the number of pictures until the switching is added to the information.

FIG. 9(a) shows a structure example (syntax) of the PES extension field data (pes_extension_field_data). FIG. 9(b) shows the content (semantics) of main information in the structure information. It should be noted that "PES_extension field length" is assumed to be given outside of the syntax structure. The 8-bit field of "start_sync_byte" indicates a code value expressing a start of an extension field.

The 8-bit field of "extension_field_type" indicates the type of the extension field. "0×01" indicates the type of "temporal_discontinuity_information," i.e., a structure in which information of a temporal discontinuity of access units (pictures) is supplied. When the type of the extension field is "0×01," temporal discontinuity information (temporal_discontinuity_information) is inserted into the field of "data_byte."

FIG. 10 shows a structure example (syntax) of temporal discontinuity information "temporal_discontinuity_information( )." FIG. 11 shows content (semantics) of main information of the structure example.

The 1-bit field of "decode_time_discontinuity_flag" is a flag indicating whether or not there is a discontinuity in a change of the value of the decoding time (or decoding time stamp). "1" indicates that there is a discontinuity and "0" indicates that there is no discontinuity. The 1-bit field of "presentation_frequency_change_flag" is flag information indicating whether or not the display time interval of access units is switched. "1" indicates that it is switched and "0" indicates that it is not switched.

When "decode_time_discontinuity_flag" is "1," the 8-bit field of "au_count_down_to_decode_time_switching" is presented. This field indicates a count-down value in units of access units (pictures) until the discontinuity has occurred in the variation of the decoding time. For example, "0x00" indicates a corresponding access unit is the last access unit before the point of discontinuity, and "0x01 to 0xFE" indicate the values of corresponding access units counted to the last access unit before the point of discontinuity.

In addition, when "presentation_frequency_change_flag" is "1," the 8-bit field of "au_count_down_to_presentation_frequency_change" is presented. This field indicates a count-down value in units of access units until the display time interval of each of the access units is switched. For example, "0x00" indicates that a corresponding access unit is the last access unit before switching of the display time interval, and "0x01 to 0xFE" indicate the values of corresponding access units counted to the last access unit before switching of the display time interval.

FIG. 12 shows an example of conversion of information regarding a display continuity at the time of switching from the first sequence (sequence A) to the second sequence (sequence B). Here, one frame period of the first sequence is assumed to be "Time Distance A," and one frame period of the second sequence is assumed to be "Time Distance B." In addition, flag information of "temporal_timing_discontinuity_flag" included in temporal refresh information SEI (temporal_refresh_information SEI) and count-down values of "au_count_down_to_presentation_frequency_change" included in temporal discontinuity information (temporal_discontinuity_information) are shown here.

In addition, the multiplexer 104 inserts the information notifying of the change from the encoded image data of the first sequence to the encoded image data of the second sequence into the transport stream TS.

As program specific information (PSI), the transport stream TS includes a program map table (PMT). This PMT has a video elementary loop (video ES1 loop) with information relating to each video stream. In this video elementary loop, information of a stream type, a packet identifier (PID), and the like as well as a descriptor describing the information relating to the video stream are disposed to correspond to each video stream. In this embodiment, the multiplexer 104 inserts a video parameter descriptor (Video_parameter_descriptor) to be newly defined as one of the descriptors.

FIG. 13 shows a structure example (syntax) of a video parameter descriptor (Video_parameter_descriptor). In addition, FIG. 14 shows content (semantics) of main information of the structure example.

The 8-bit field of "descriptor_tag" indicates the type of the descriptor, indicating video parameter descriptor here. The 8-bit field of "descriptor_length" indicates the length (size) of the descriptor, showing the number of succeeding bytes as the length of the descriptor.

The 1-bit field of "resolution_change_flag" is flag information indicating whether or not there is a change in horizontal and vertical resolution. The "1-bit field of "video_frame_rate_change_flag" is a 1-bit field indicating whether or not there is a change in the frame frequency (frame rate) of a picture. The 1-bit field of "video_bit_depth_change_flag" is flag information indicating whether or not there is a change in an encoded bit width. The 1-bit field of "color_gamut_change_flag" is flag information indicating whether or not there is a change in a color gamut of an encoded picture. The 1-bit field of "dynamic_range_change_flag" is flag information indicating whether or not there is a change in the range of brightness and darkness of luminance.

The 4-bit field of "video_resolution1" indicates current horizontal and vertical resolution. The 4-bit field of "video_frame_rate1" indicates the frame frequency of a current picture. "video_bit_depth1" indicates a current encoded bit width. "color_gamut1" indicates a gamut of a currently encoded picture. "luma_dynamic_range1" indicates the range of brightness and darkness of current luminance.

When "resolution_change_flag=1" is set indicating that there is a change in horizontal and vertical resolution, the 4-bit field of "video_resolution2" is presented. This field indicates the changed horizontal and vertical resolution. In addition, when "video_frame_rate_change_flag=1" is set indicating that there is a change in the frame frequency of the picture, the 4-bit field of "video_frame_rate2" is presented. This field indicates the changed frame frequency of the picture.

In addition, when "video_bit_depth_change_flag=1" is set indicating that there is a change in an encoded bit width, the 4-bit field of "video_bit_depth2" is presented. This field indicates the changed encoded bit width. Furthermore, when "color_gamut_change_flag=1" is set indicating that there is a change in a gamut of an encoded picture, the 4-bit field of "color_gamut2" is presented. This field indicates the changed gamut of the encoded picture. Furthermore, when "dynamic_range_change_flag=1" is set indicating that there is a change in the range of brightness and darkness of luminance, the 4-bit field of "luma_dynamic_range2" is presented. This field indicates the changed range of brightness and darkness of luminance.

Figure 15:
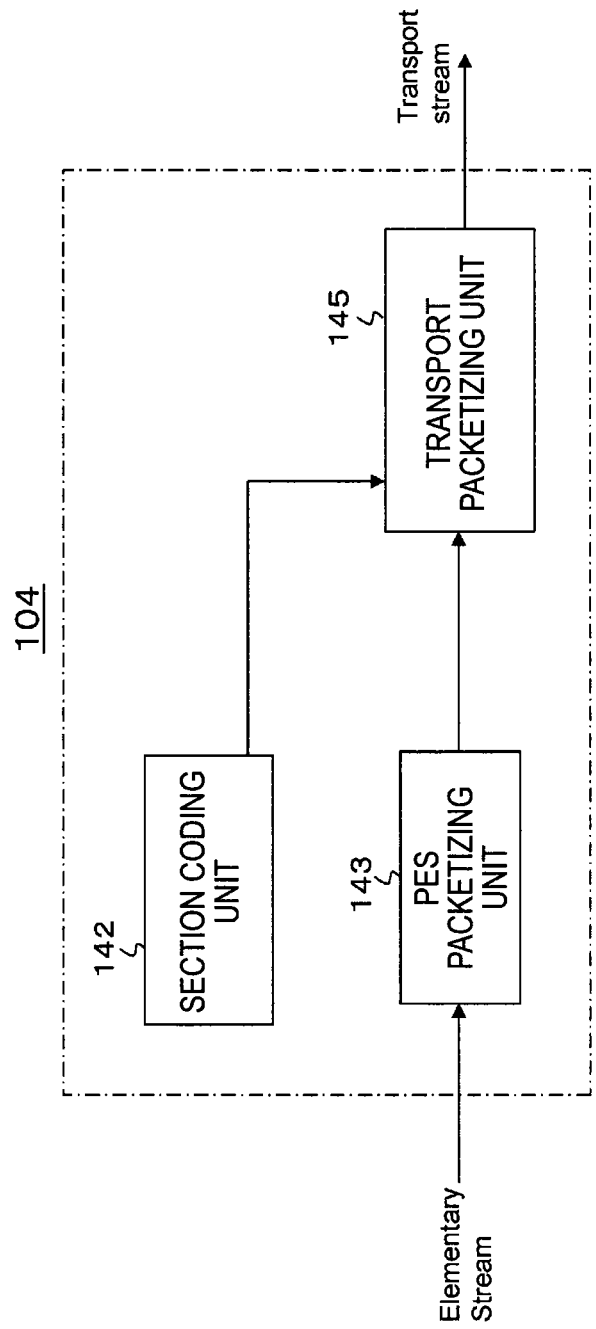
FIG. 15 is a block diagram showing a configuration example of a multiplexer.

FIG. 15 shows a configuration example of the multiplexer 104. The multiplexer has a section coding unit 142, a PES packetizing unit 143, and a transport packetizing unit 145.

The PES packetizing unit 143 reads a video stream (elementary stream) accumulated in the compressed data buffer 103 to generate a PES packet. At this time, the PES packetizing unit 143 places a time stamp such as a decoding time stamp (DTS) and a presentation time stamp (PTS) to a PES header based on HRD information and the like of the video stream. In this case, "cpu_removal_delay" and "dpb_output_delay" of each picture are referred to, time stamps are converted into each DTS and PTS in synchronized precision with the time of a system time clock (STC), and disposed in predetermined positions of the PES headers.

In addition, at this time, the PES packetizing unit 143 creates the above-described temporal discontinuity information (temporal_discontinuity_information) (see FIG. 10) based on information on a temporal discontinuity of pictures (access units) included in a video stream. Then, the PES packetizing unit 143 inserts this information into the field of a PES extension of a PES packet.

The section coding unit 142 generates various kinds of section data to be inserted into the transport stream TS. At this time, the section coding unit 142 also creates the above-described video parameter descriptor (Video_parameter_descriptor) (see FIG. 13) based on, for example, the information on the temporal discontinuity of the pictures (access units) included in the video stream.

The PES packet generated by the PES packetizing unit 143 is sent to the transport packetizing unit 145. In addition, the various kinds of section data generated by the section coding unit 142 are also sent to the transport packetizing unit 145. The transport packetizing unit 145 generates a TS packet which includes the PES packet and section data in its payload, and then generates a transport stream TS.

Figure 16:
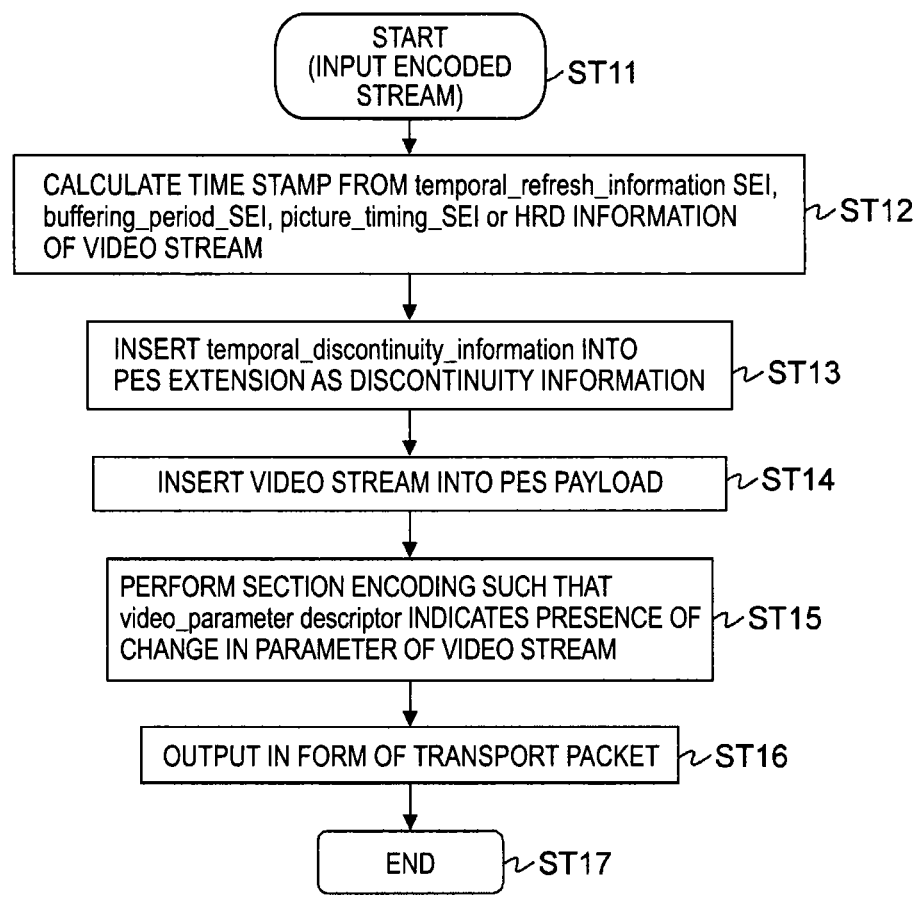
FIG. 16 is a diagram showing an example of a process flow of a multiplexer.

FIG. 16 shows an example of the process flow of the multiplexer 104. The multiplexer 104 starts the process in Step ST11, and then moves to the process of Step ST12. In this Step ST12, the multiplexer 104 computes a time stamp from temporal refresh information SEI, picture timing SEI, buffering period SEI, or HRD information of the video stream (elementary stream).

Then, the multiplexer 104 creates temporal discontinuity information in Step ST13 as discontinuity information, and inserts the information into the field of the PES extension. Then, the multiplexer 104 inserts the video stream (elementary stream) into the PES payload in Step ST14.

Then, the multiplexer 104 generates various kinds of section data in Step ST15. As one kind of this section data, a video parameter descriptor which indicates presence of a change in a parameter of the video stream (elementary stream) is also generated. Then, the multiplexer 104 generates and outputs a TS packet which includes a PES packet and section data in its payload in Step ST16. After the process of Step ST16, the multiplexer 104 finishes the process in Step ST17.

Figure 17:
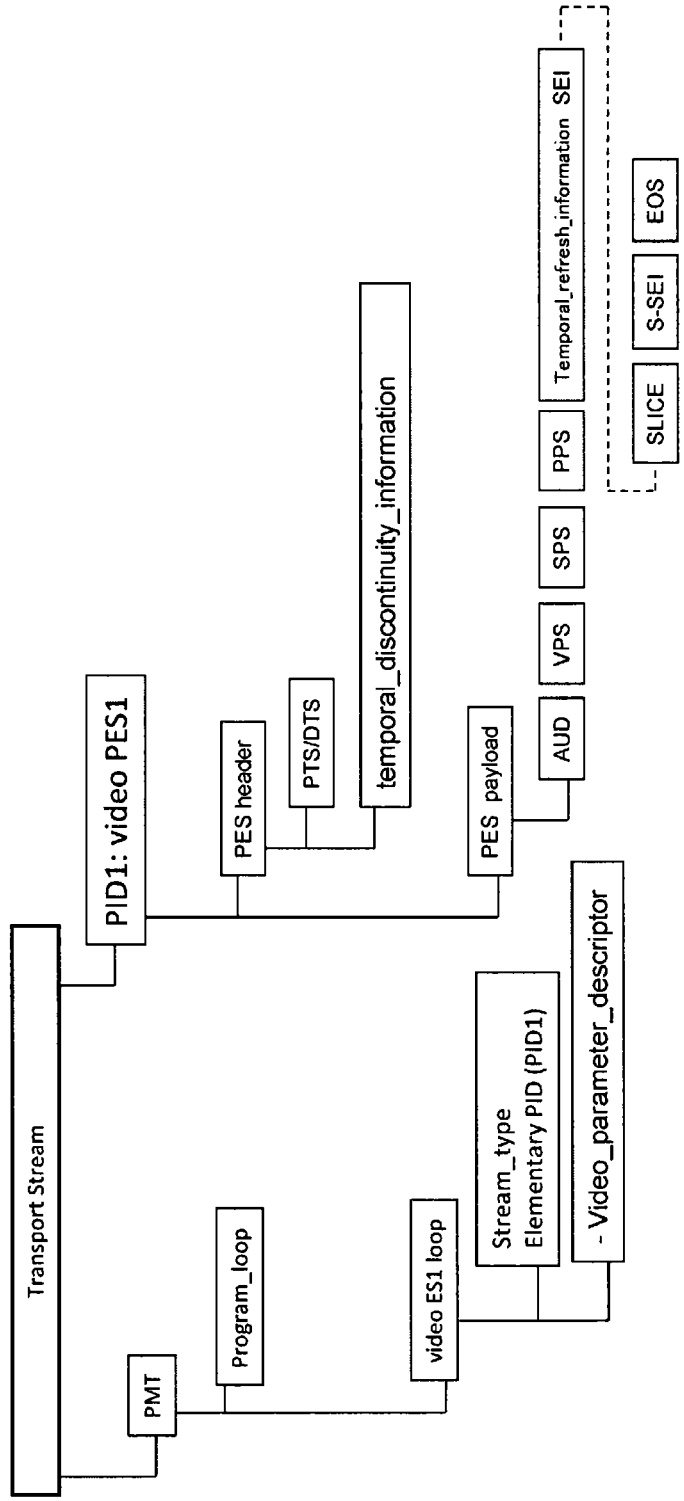
FIG. 17 is a diagram showing a configuration example of a transport stream TS.

FIG. 17 shows a configuration example of the transport stream TS. This transport stream TS includes one video stream. In other words, in this configuration example, there is a PES packet "video PES1" of the video stream.

Encoded image data of each picture is disclosed in the PES payload. In the case of HEVC encoding, the encoded image data is composed of NAL units such as a VPS, an SPS, SEI, a PPS, P-SEI, SLICE, S-SEI, and EOS. The above-described temporal refresh information SEI (temporal_refresh_information SEI) is inserted as one of the P-SEI.

In addition, the above-described temporal discontinuity information (temporal_continuity_information) is inserted into the field of the PES extension of a PES header. It should be noted that a DTS and a PTS are also disposed in the PES header.

In addition, the transport stream TS includes a program map table (PMT) as program specific information (PSI). This PSI is information describing to which program each elementary stream included in the transport stream is affiliated.

In the PMT, there is a program loop describing information relating to an entire program. In addition, in the PMT, there is an elementary loop having information relating to each elementary stream. In this configuration example, there is a video elementary loop (video ES1 loop).

In the video elementary loop, information of the type of stream, a packet identifier (PID), and the like are disposed, and descriptors describing information relating to the video stream are also described corresponding to the video stream (video PES1). As one of the descriptors, the above-described video parameter descriptor (video_parameter_descriptor) is inserted.

Returning to FIG. 2, the transmission unit 105 modulates the transport stream TS in a modulation scheme proper for broadcasting, for example, QPSK-OFDM, and transmits an RF modulation signal from a transmission antenna.

An operation of the transmission device 100 shown in FIG. 2 will be briefly described. The encoder 102 receives an input of uncompressed image data. In the encoder 102, encoding in, for example, H.264/AVC, H.265/HEVC, or the like is performed on the image data. In this case, image data of different frame rates is switched to be input to the encoder 102. Thus, the encoder 102 generates a video stream having a frame rate switched part, i.e., a part which is switched from encoded image data of a first sequence to encoded image data of a second sequence which has a different frame rate from the first sequence.

The encoder 102 performs encoding such that a display end timing of the last picture of the encoded image data of the first sequence is set to the same timing as a display start timing of the first picture of the encoded image data of the second sequence. In addition, the encoder 102 performs encoding such that the encoded image data of the first sequence and the encoded image data of the second sequence have the same number of delayed pictures for the time from decoding to display. Furthermore, the encoder 102 performs encoding such that the decoding timing of the first picture of the encoded image data of the second sequence is set at a timing later than a timing obtained by adding one frame period of the encoded image data of the first sequence to the decoding timing of the last picture of the encoded image data of the first sequence.

In addition, the encoder 102 inserts information indicating whether or not there is a change in a frame rate into each piece of encoded image data of each picture of the video stream. In other words, the encoder 102 inserts temporal refresh information SEI (temporal_refresh_information SEI) (see FIG. 5(*b*)) into the encoded image data of each picture as one kind of prefix SEI (Prefix_SEI).

The video stream which is generated by the encoder 102, including the encoded data of the pictures of each layer, is supplied to the compressed data buffer (cpb) 103 and temporarily stored therein. In the multiplexer 104, the video stream accumulated in the compressed data buffer 103 is read, PES packetized, and further transport packetized and multiplexed, and thereby a transport stream TS is obtained as a multiplexed stream.

The multiplexer 104 inserts information notifying of a change from the encoded image data of the first sequence to the encoded image data of the second sequence into the packet which contains the video stream, for example, a PES packet. In other words, temporal discontinuity information (temporal_discontinuity_information) (see FIG. 10) is inserted into the field of the PES extension of the PES packet.

In addition, the multiplexer 104 inserts the information notifying of the change from the encoded image data of the first sequence to the encoded image data of the second sequence into the transport stream TS. In other words, a video parameter descriptor (Video_parameter_descriptor) (see FIG. 13) is inserted into a video elementary loop.

The transport stream TS generated by the multiplexer 104 is sent to the transmission unit 105. In the transmission unit 105, the transport stream TS is modulated in a modulation scheme proper for broadcasting, for example, QPSK-OFDM, and an RF modulation signal is transmitted from a transmission antenna.

<Configuration of a Reception Device>

Figure 18:
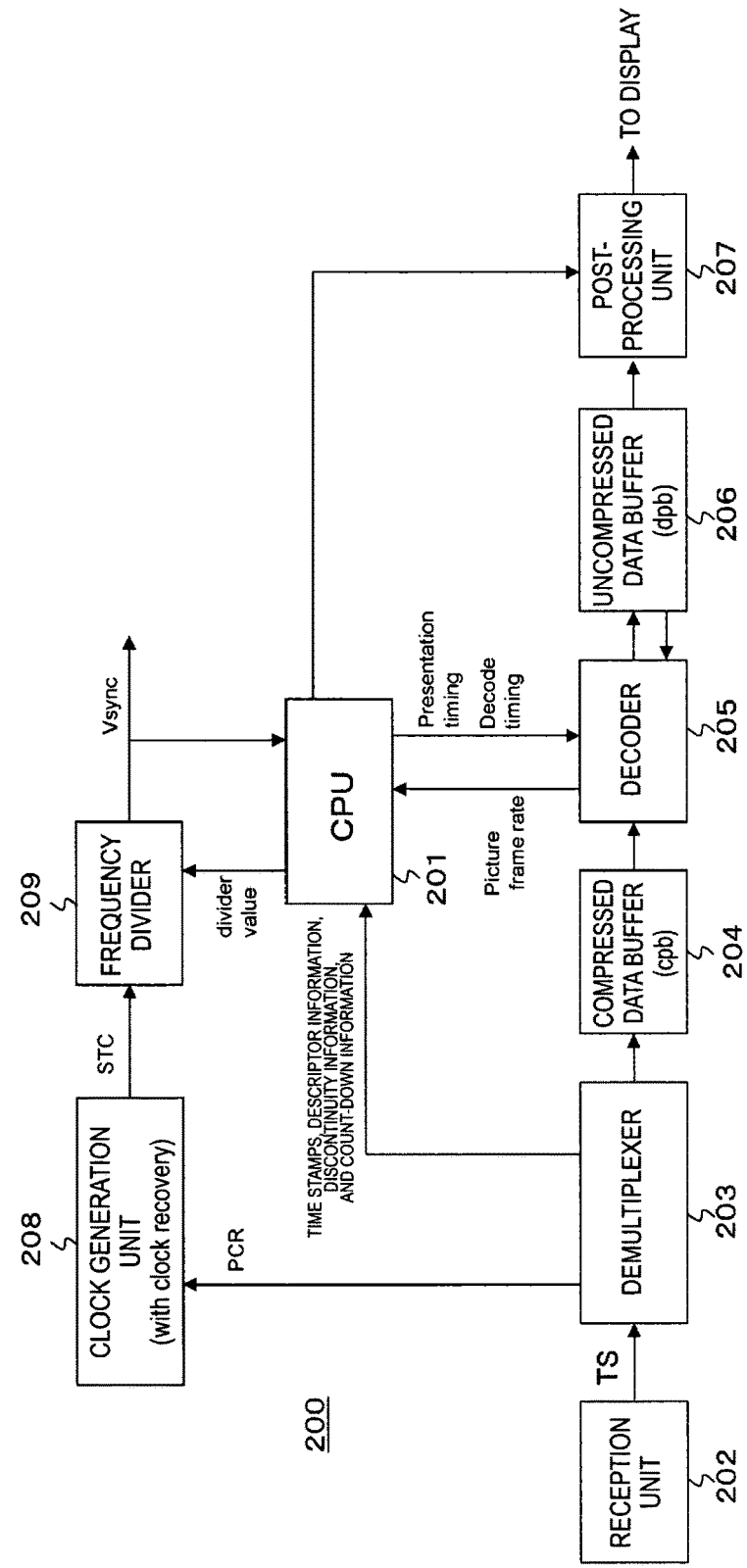
FIG. 18 is a block diagram showing a configuration example of a reception device.

FIG. 18 shows a configuration example of the reception device 200. This reception device 200 has a central processing unit (CPU) 201, a reception unit 202, a demultiplexer 203, and a compressed data buffer (coded picture buffer or cpb) 204. Further, the reception device 200 has a decoder 205, an uncompressed data buffer (decoded picture buffer or dpb) 206, a post-processing unit 207, a clock generation unit 208, and a frequency divider 209. The CPU 201 constitutes a control unit which controls operations of each unit of the reception device 200.

The reception unit 202 demodulates an RF-modulated signal received by a reception antenna to acquire the transport stream TS. The transport stream TS includes the video stream (video data) with the switched part from the encoded image data of the first sequence to the encoded image data of the second sequence having the different frame rate from the first sequence. The demultiplexer 203 takes out the video stream and sends the stream to the compressed data buffer (coded picture buffer or cpb) 204.

Figure 19:
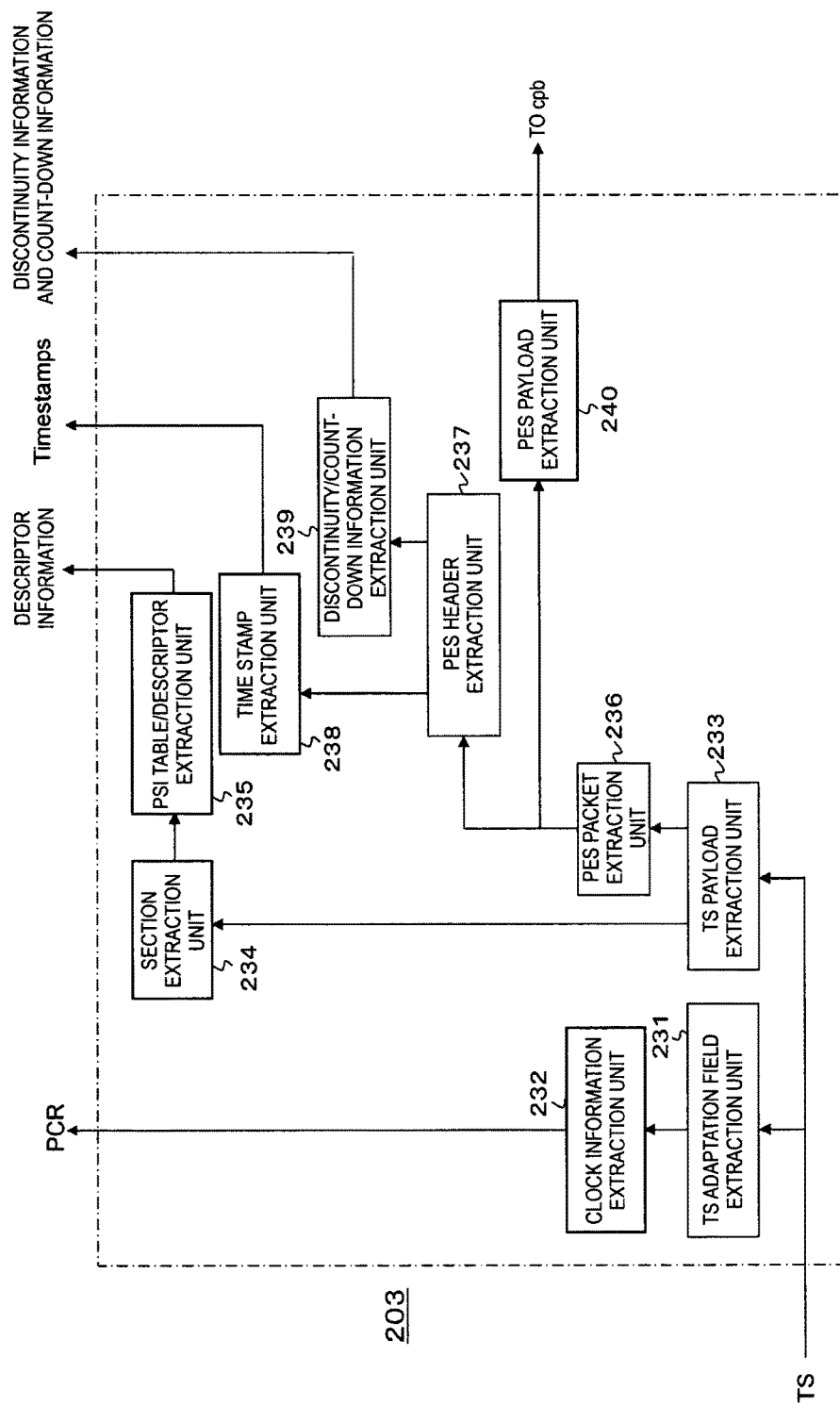
FIG. 19 is a block diagram showing a configuration example of a demultiplexer.

FIG. 19 shows a configuration example of the demultiplexer 203. The demultiplexer 203 has a TS adaptation field extraction unit 231, a clock information extraction unit 232, a TS payload extraction unit 233, a section extraction unit 234, a PSI table/descriptor extraction unit 235, and a PES packet extraction unit 236. Furthermore, the demultiplexer 203 has a PES header extraction unit 237, a time stamp extraction unit 238, a discontinuity/count-down information extraction unit 239, and a PES payload extraction unit 240.

The TS adaptation field extraction unit 231 extracts an adaptation field from a TS packet having the adaptation field of the transport stream TS. The clock information extraction unit 232 extracts a program clock reference (PCR) from the adaptation field in which the PCR is included, and sends the PCR to the clock generation unit 208.

The TS payload extraction unit 233 extracts the TS payload from the TS packet having the TS payload of the transport stream TS. The section extraction unit 234 extracts section data from the TS payload which includes the section data. The PSI table/descriptor extraction unit 235 analyzes the section data extracted by the section extraction unit 234 and extracts a PSI table or a descriptor. Then, the PSI table/descriptor extraction unit 235 sends descriptor information to the CPU 201.

This descriptor information also includes the above-described video parameter descriptor (Video_parameter_descriptor). The CPU 201 can recognize a change in the frame frequency (frame rate) in advance from the information of the video parameter descriptor and further can also recognize the changed frame frequency.

The PES packet extraction unit 236 extracts a PES packet from the TS payload which includes the PES packet. The PES header extraction unit 237 extracts the PES header from the PES packet extracted by the PES packet extraction unit 236. The time stamp extraction unit 238 extracts time stamps (DTS and PTS) inserted into the PES header in units of pictures and sends the time stamps to the CPU 201.

In addition, the discontinuity/count-down information extraction unit 139 extracts the above-described temporal discontinuity information (temporal_discontinuity_information) inserted into the area of the PES extension of the PES header in units of pictures, and sends discontinuity information and count-down information to the CPU 201.

In this case, when there is a discontinuity in a change of the value of a decoding time (or decoding time stamp), the CPU 201 can recognize the discontinuity in advance and further can clearly ascertain progress until a discontinuity occurs in units of access units (pictures) from the count-down information (count-down value). In addition, when a display time interval of each access unit (picture) is switched, the CPU 201 can recognize the switching in advance and further can clearly ascertain progress of units of access units (pictures) until the switching from the count-down information (count-down value).

The PES payload extraction unit 240 extracts the PES payload, i.e., encoded image data of each picture, from the PES packet extracted by the PES packet extraction unit 236 and sends the data to the compressed data buffer (coded picture buffer or cpb) 204.

Figure 20:
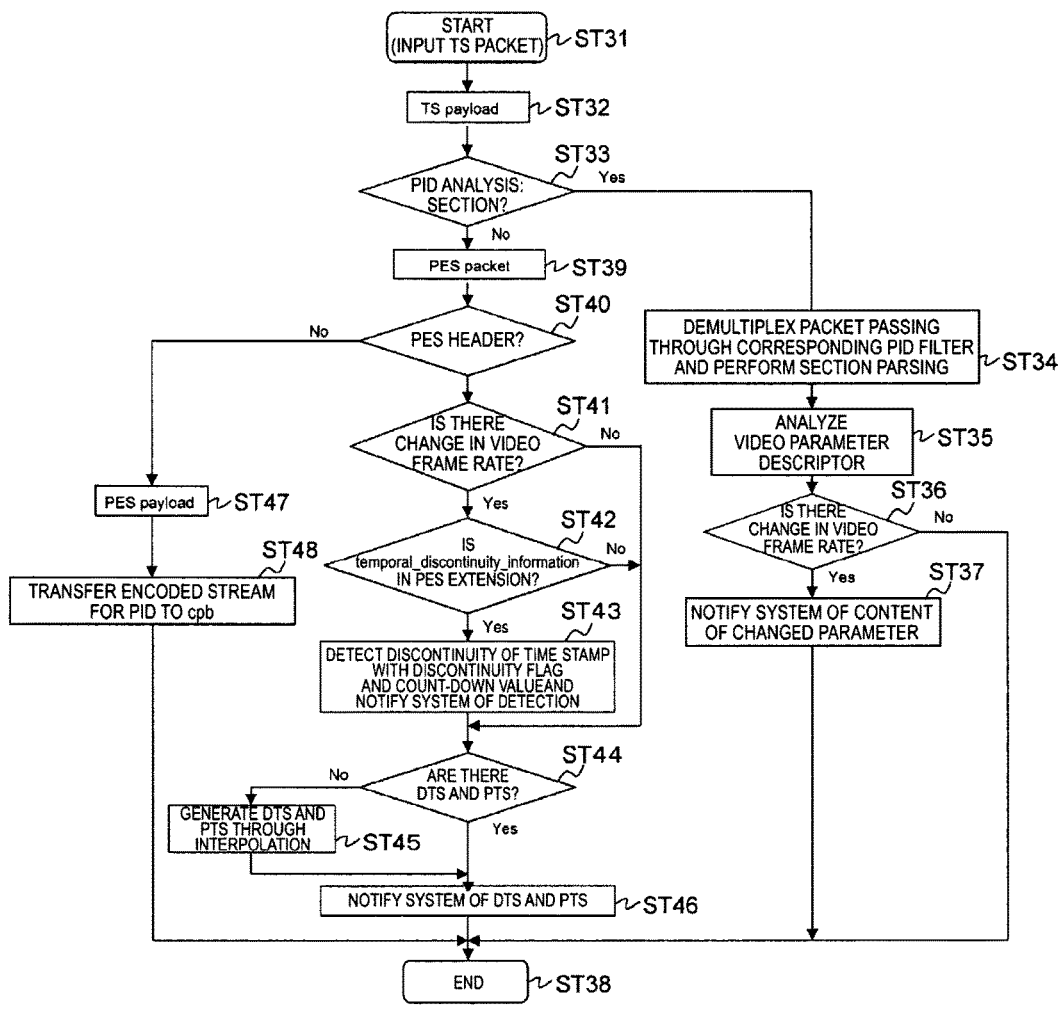
FIG. 20 is a diagram showing an example of a process flow of the demultiplexer.

FIG. 20 shows an example of the process flow of the demultiplexer 203. The demultiplexer 203 starts the process in Step ST31 and then extracts the TS payload in Step ST32. Then, the demultiplexer 203 performs analysis of a HD in Step ST33 to determine whether or not it is a section. When it is determined to be a section, the demultiplexer 203 demultiplexes a packet passing through a corresponding PID filter in Step ST34 to perform section parsing.

Then, the demultiplexer 203 analyzes the video parameter descriptor (Video_parameter_descriptor) in Step ST35. Then, the demultiplexer 203 determines whether or not there is a change in the frame rate (frame frequency) in Step ST36. When there is a change in the frame rate, the demultiplexer 203 notifies the system, i.e., the CPU 201 of the changed frame rate in Step ST37.

Then, the demultiplexer 203 moves to Step ST38 and finishes the process. It should be noted that, when there is no change in the frame rate in Step ST36, the demultiplexer 203 directly moves to Step ST38 to finish the process.

In addition, when it is not a section in Step ST33, the demultiplexer 203 extracts the PES packet in Step ST39. Then, the demultiplexer 203 determines whether or not it is the PES header in Step ST40. When it is the PES header, the demultiplexer 203 determines whether or not there is a change in the frame rate in the analysis of the video parameter descriptor in Step ST41.

When there is a change in the frame rate, the demultiplexer 203 determines whether or not there is temporal discontinuity information (temporal_discontinuity_information) in the field of the PES extension in Step ST42. The determination of Step ST41 is assumed to coincide with the result of Step ST36.

When there is temporal discontinuity information, the demultiplexer 203 detects a discontinuity of the time stamp with a discontinuity flag of the temporal discontinuity information and the count-down value, and notifies the system, i.e., the CPU 201 of the detection in Step ST43. Then, the demultiplexer 203 moves to the process of Step ST44. It should be noted that, when there is no change in the frame rate Step ST41, or when there is no temporal discontinuity information in Step ST42, the demultiplexer 203 directly moves to the process of Step ST44.

In Step ST44, the demultiplexer 203 determines whether or not there are a DTS and a PTS. When there are a DTS and a PTS, the demultiplexer 203 moves to the process of Step ST46. On the other hand, when there is neither DTS nor PTS, the demultiplexer 203 generates a DTS and a PTS through interpolation in Step ST45, and then moves to the process of Step ST46. In Step ST46, the demultiplexer 203 notifies the system, i.e., the CPU 201 of the DTS and the PTS. Then, the demultiplexer 203 moves to Step ST38 to finish the process.

In addition, when it is not the PES header in Step ST40, the demultiplexer 203 extracts the PES payload in Step ST47. Then, the demultiplexer 203 transfers an encoded stream for the PID to the compressed data buffer (cpb) 204 in Step ST48. Then, the demultiplexer 203 moves to Step ST38 to finish the process.

Returning to FIG. 18, the compressed data buffer (cpb) 204 temporarily accumulates the video stream (encoded stream) taken by the demultiplexer 203. The decoder 205 decodes encoded image data of each of pictures of the video stream accumulated in the compressed data buffer 204 at decoding timings of the pictures, and sends the data to the uncompressed data buffer (dpb) 206.

Here, the CPU 201 gives the decoder 205 decoding timings based on the decoding time stamp (DTS). It should be noted that, when the decoder 205 decodes the encoded image data of each picture, the decoder reads and uses image data of a reference source picture from the uncompressed data buffer 206.

Figure 21:
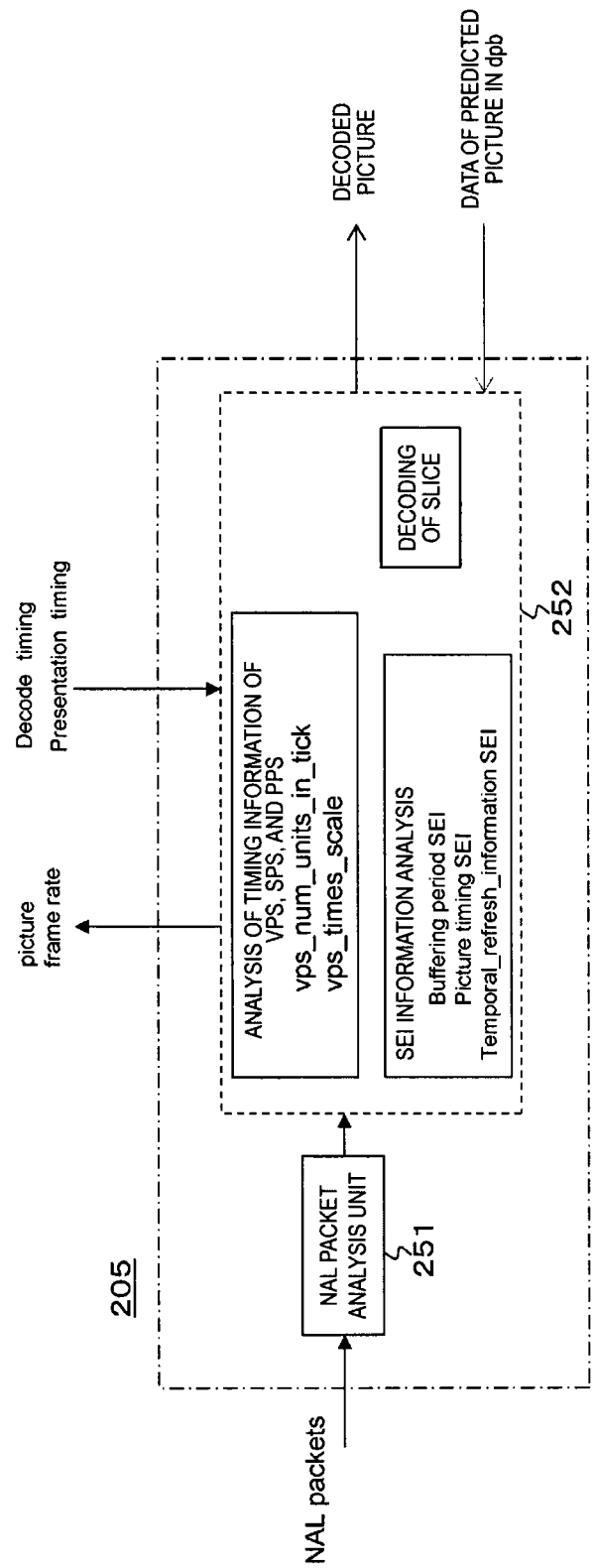
FIG. 21 is a block diagram showing a configuration example of a decoder.

FIG. 21 shows a configuration example of the decoder 205. This decoder 205 has an NAL packet analysis unit 251 and a decoding unit 252. The NAL packet analysis unit 251 analyzes each NAL packet composing encoded image data to determine a parameter set such as a VPS, an SPS, or a PPS, SEI, and a slice. The NAL packet analysis unit 251 sends each NAL packet along with the determination result to the decoding unit 252.

The decoding unit 252 sequentially decodes encoded image data of each of pictures included in the video stream (encoded stream) sent via the NAL packet analysis unit 251 at decoding timings, and sends the data to the uncompressed data buffer (dpb) 206. In this case, the decoding unit 252 performs analysis of timing information of a VPS, an SPS, and a PPS to ascertain "general_level_idc" which is the level of the bit rate of an entire stream or "sublayer_level_idc" which is the level of the bit rate of each sublayer, and to check whether or not decoding can be performed within its decoding capability. In addition, in this case, the decoding unit 252 analyzes SEI to ascertain, for example, "initial_cpb_removal_time" and "cpb_removal_delay" and to check whether a decoding timing sent from the CPU 201 is proper.

In addition, in this case, the decoding unit 252 obtains a frame rate (frame frequency) from information of "vps_num_units_in_tick" and "vps_times_scale" included in the VPS and sends the frame rate to the CPU 201. Accordingly, the CPU 201 can check the frame rate of a picture that is currently undergoing decoding. It should be noted that the decoding unit 252 can determine whether or not a picture is one with a discontinuity in time information and a time stamp by analyzing temporal refresh information SEI, and when the picture is one with a discontinuity, a frame rate (frame frequency) can also be obtained from information of "num_units_in_tick" and "times_scale" included in that SEI.

When decoding a slice, the decoding unit 252 acquires "ref_idx_l0_active (ref_idx_l1_active) from the slice header as information indicating a prediction destination in the time direction to perform prediction in the time direction. It should be noted that decoded pictures are processed to be referred to by other pictures using "short_term_ref_pic_set_idx" or "it_idx_sps" obtained from the slice header as an index.

Returning to FIG. 18, the uncompressed data buffer (dpb) 206 temporarily stores the image data of each picture decoded by the decoder 205. The post-processing unit 207 performs a process on the image data of each of the pictures sequentially read from the uncompressed data buffer (dpb) 206 at display timings to cause the frame rate thereof to match a display capability. In this case, the display timings are given to the decoder 205 from the CPU 201 based on a presentation time stamp (PTS).

For example, when the frame rate of the decoded image data of the pictures is 120 fps and the display capability is 120 fps, the post-processing unit 207 sends the decoded image data of the pictures to a display as it is. In addition, when, for example, the frame rate of the decoded image data of the pictures is 120 fps and the display capability is 60 fps, the post-processing unit 207 performs a subsampling process so that time-direction resolution is half that of the decoded image data of the pictures, and sends the data to the display as image data of 60 fps.

In addition, when the frame rate of the decoded image data of the pictures is 60 fps and the display capability is 120 fps, the post-processing unit 207 performs an interpolation process so that time-direction resolution is twice the decoded image data of the pictures, and sends the data to the display as image data of 120 fps. In addition, when, for example, the frame rate of the decoded image data of the pictures is 60 fps and the display capability is 60 fps, the post-processing unit 207 sends the decoded image data of the pictures to the display as it is.

The clock generation unit CPU 201 generates a system clock STC which is synchronized with the PCR extracted by the demultiplexer 203. The frequency divider 209 divides the frequency of this system clock STC and outputs a vertical synchronization signal Vsync. This vertical synchronization signal Vsync is supplied to the CPU 201 and also supplied to the demultiplexer 203, the decoder 205, and the post-processing unit 207, and further other necessary spots.

The frequency of this vertical synchronization signal Vsync is controlled according to supply of a frequency division value (divider value) from the CPU 201. In this embodiment, the frequency of the vertical synchronization signal Vsync is switched to match the frame rate of the first sequence until the display start timing of the first picture of the second sequence, and to match the frame rate of the second sequence from the display start timing.

Thus, in the present embodiment, before the display start timing of the first picture of the second sequence, encoded image data of each picture of the second sequence is decoded at the decoding timing of encoded image data of each picture of the first sequence.

Figure 22:
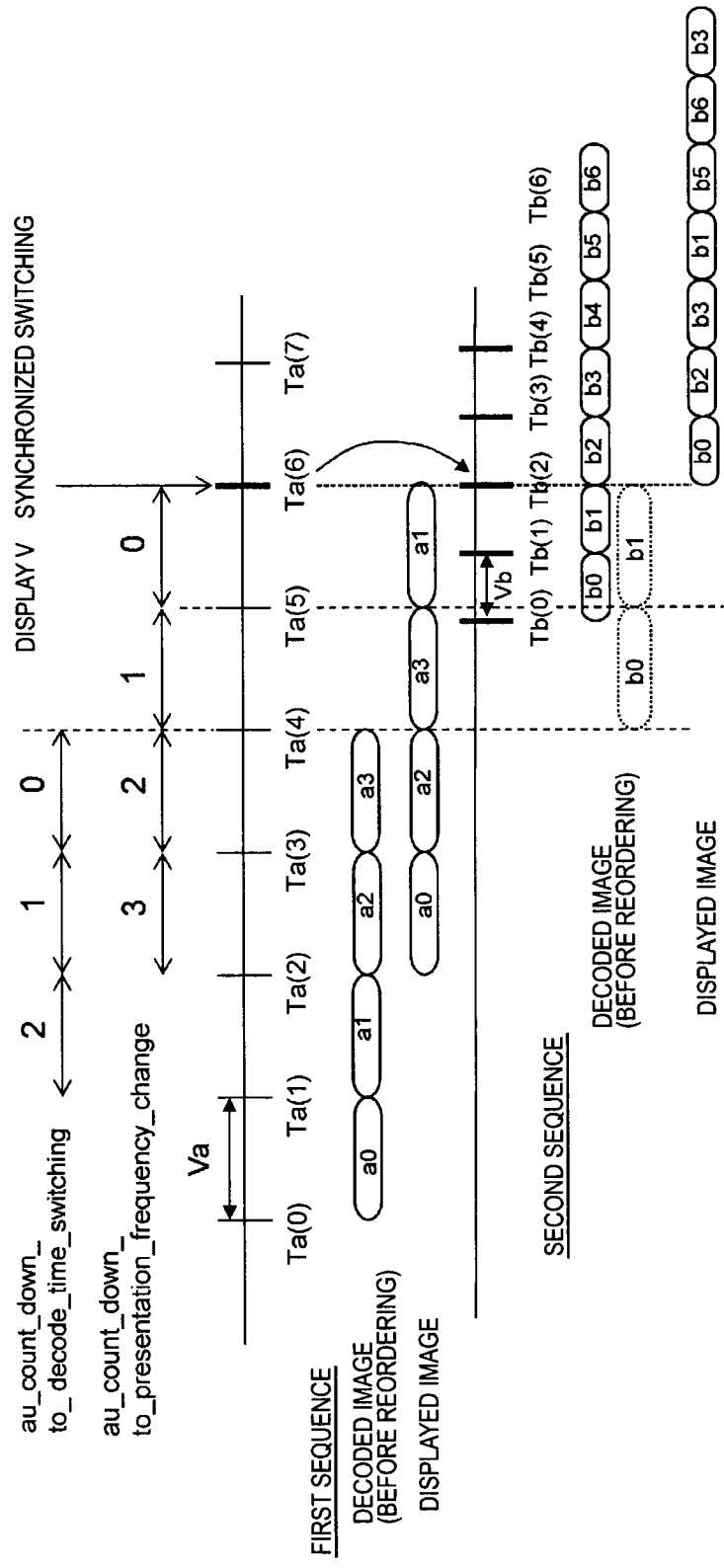
FIG. 22 is a diagram for describing an example of a switching timing of a vertical synchronization signal Vsync.

FIG. 22 shows an example of a switching timing of the vertical synchronization signal Vsync. In this illustrated example, the first sequence is composed of 4 pictures, which are decoded in the order of a0, a1, a2, and a3 and displayed in the order of a0, a2, a3, and a1. In this case, the number of delayed pictures after the first sequence is decoded until display thereof is started is set to 2.

Each of the pictures of the first sequence is decoded and displayed at a timing of the vertical synchronization signal (Vsync) having a time interval Va corresponding to a frame rate (frame frequency) thereof. For example, the pictures a0, a1, a2, and a3 are decoded at timings Ta(0), Ta(1), Ta(2), and Ta(3), and display of the pictures a0, a2, a3, and a1 is started at timings Ta(2), Ta(3), Ta(4), and Ta(5).

The second sequence is composed of 7 pictures, which are decoded in the order of b0, b1, b2, b3, b4, b5, and b6 and displayed in the order of b0, b2, b3, b1, b5, b6, and b3. In this case, the number of delayed pictures after the second sequence is decoded until display thereof is started is set to 2, the same as the first sequence.

Timings of decoding and display are set in encoding such that each of the pictures of the second sequence is decoded and displayed at timings of the vertical synchronization signal (Vsync) having a time interval Vb (<Va) corresponding to a frame rate (frame frequency) thereof. In this embodiment, however, the frequency is switched to match the frame rate of the first sequence until the display start timing (Tb(2)) of the first picture of the second sequence, and to match the frame rate of the second sequence from that timing.

Thus, before the display start timing (Tb(2)) of the first picture of the second sequence, the decoder 205 decodes the encoded image data of each of the pictures (the pictures b0 and b1 in the illustrated example) of the second sequence at the decoding timing of the encoded image data of each picture of the first sequence with continuity in decoding timings with the first sequence maintained.

In other words, the pictures b0 and b1 are decoded at the timings Ta(4) and Ta(5). The picture b0 can be decoded even before the timing (Tb(0)) because the demultiplexer 203 extracts temporal discontinuity information (temporal_discontinuity_information) from the area of the PES extension at the timing at which the leading byte of the last picture of the first sequence enters the compressed data buffer (cpb) 204 at the latest (the timing P1 in FIG. 3) and detects discontinuity information.

In addition, as described above, switching of the vertical synchronization signal Vsync is performed at the display start timing (Tb(2)) of the first picture of the second sequence, i.e., the display end timing (Ta(6)) of the last picture of the first sequence. The CPU 201 can detect the necessity of the switching of the vertical synchronization signal Vsync at this timing from the discontinuity information that is the temporal discontinuity information and the count-down information.

Figure 23:
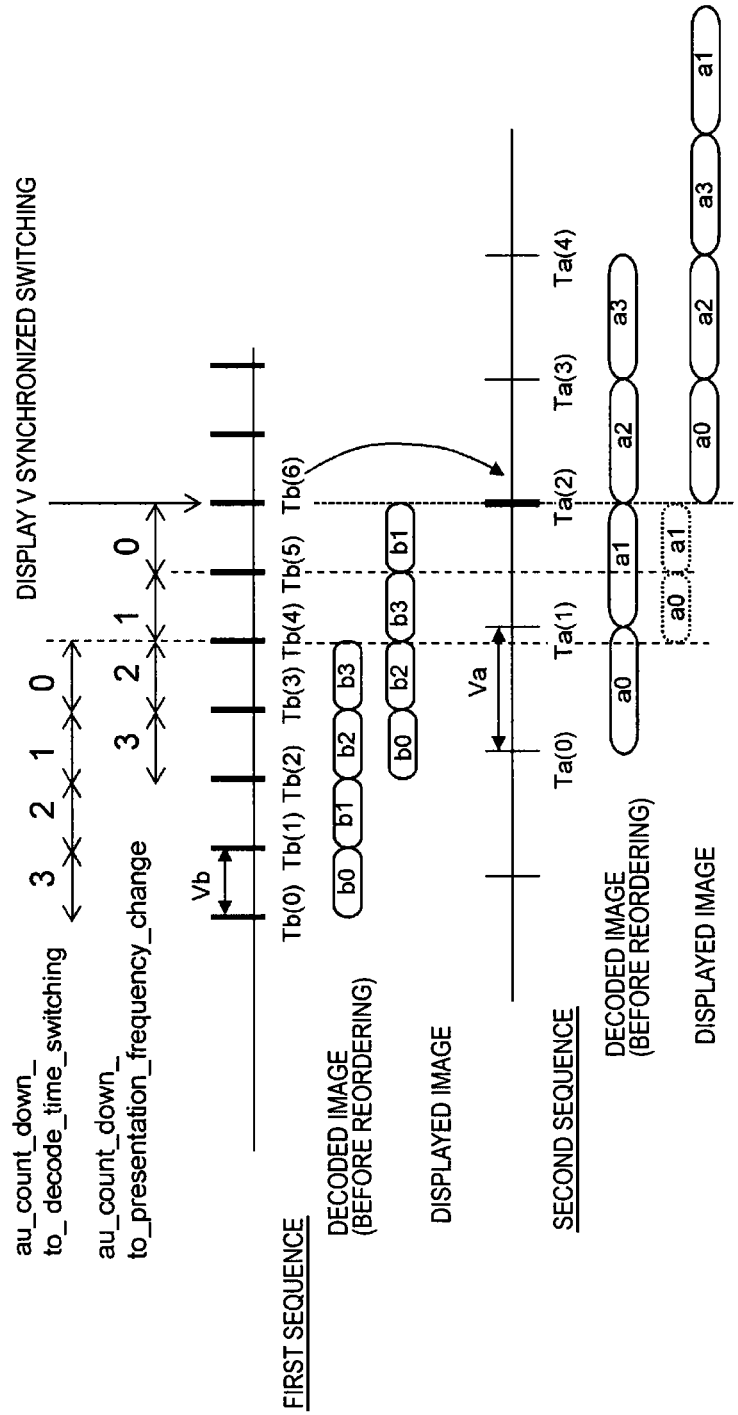
FIG. 23 is a diagram for describing another example of the switching timing of the vertical synchronization signal Vsync.

FIG. 23 also shows another example of the switching timing of the vertical synchronization signal Vsync. The example of FIG. 22 shows that a frame cycle (time interval) of the first sequence is set to Va and a frame cycle (time interval) of the second sequence is set to Vb (<Va), but this example is the case reversed thereto. In other words, in this example, a frame cycle (time interval) of the first sequence is set to Vb and a frame cycle (time interval) of the second sequence is set to Va (>Vb).

In the illustrated example, the first sequence is composed of 4 pictures, which are decoded in the order of b0, b1, b2, and b3, and displayed in the order of b0, b2, b3, and b1. In this case, the number of delayed pictures after the sequence is decoded until display thereof is started is set to 2.

Each of the pictures of the first sequence is decoded and displayed at a timing of the vertical synchronization signal (Vsync) having the time interval Vb corresponding to a frame rate (frame frequency) thereof. For example, the pictures b0, b1, b2, and b3 are decoded at the timings Tb(0), Tb(1), Tb(2), and Tb(3), and display of the pictures b0, b2, b3, and b1 is started at the timings Tb(2), Tb(3), Tb(4), and Tb(5).

The second sequence is composed of 4 pictures, which are decoded in the order of a0, a1, a2, and a3, and displayed in the order of a0, a2, a3, and a1. In this case, the number of delayed pictures after the sequence is decoded until display thereof is started is set to 2, the same as the first sequence.

Timings of decoding and display are set in encoding such that each of the pictures of the second sequence is decoded and displayed at a timing of the vertical synchronization signal (Vsync) having the time interval Va (>Vb) corresponding to a frame rate (frame frequency) thereof. In this embodiment, however, the frequency is switched to match the frame rate of the first sequence until the display start timing (Ta(2)) of the first picture of the second sequence, and to match the frame rate of the second sequence from that timing.

Thus, before the display start timing (Ta(2)) of the first picture of the second sequence, the decoder 205 decodes the encoded image data of each of the pictures (the pictures a0 and a1 in the illustrated example) of the second sequence at the decoding timing of the encoded image data of each picture of the first sequence with continuity in decoding timings with the first sequence maintained.

In other words, the pictures a0 and a1 are decoded at the timings Tb(4) and Tb(5). The picture a0 can be decoded even after the timing (Ta(0)) because the demultiplexer 203 extracts temporal discontinuity information (temporal_discontinuity_information) from the area of the PES extension at the timing at which the leading byte of the last picture of the first sequence enters the compressed data buffer (cpb) 204 at the latest (the timing P1 in FIG. 3) and detects discontinuity information.

In addition, switching of the vertical synchronization signal Vsync is performed at the display start timing (Ta(2)) of the first picture of the second sequence, i.e., the display end timing (Tb(6)) of the last picture of the first sequence as described above. The CPU 201 can detect the necessity of the switching of the vertical synchronization signal Vsync at this timing from the discontinuity information that is the temporal discontinuity information and the count-down information.

An operation of the reception device 200 shown in FIG. 18 will be briefly described. The reception unit 202 demodulates an RF-modulated signal received by the reception antenna to acquire the transport stream TS. The transport stream TS includes a video stream with a switched part from encoded image data of the first sequence to encoded image data of the second sequence having a different frame rate from the first sequence. This transport stream TS is sent to the demultiplexer 203. The demultiplexer 203 takes out the video stream from the transport stream TS and sends the stream to the compressed data buffer (cpb) 204 to cause the stream to be temporarily accumulated.

In addition, the demultiplexer 203 extracts the program clock reference (PCR) from an adaptation field of a TS packet. This PCR is supplied to the clock generation unit 208. The clock generation unit 208 generates the system clock STC which is synchronized with the PCR. Then, this system clock STC undergoes frequency division by the frequency divider 209 to obtain the vertical synchronization signal Vsync. This vertical synchronization signal Vsync is supplied to the CPU 201 and also to necessary spots such as the demultiplexer 203, the decoder 205, and the post-processing unit 207.

In addition, the demultiplexer 203 extracts a descriptor such as the video parameter descriptor (Video_parameter_descriptor) from the transport stream TS and supplies the descriptor to the CPU 201. The CPU 201 can recognize a change in the frame frequency (frame rate) in advance from the information of the video parameter descriptor, and can further recognize the changed frame frequency.

In addition, the demultiplexer 203 extracts the temporal discontinuity information (temporal_discontinuity_information) inserted in the area of the PES extension of the PES header for each picture, and the discontinuity information and the count-down information are supplied to the CPU 201.

Accordingly, when there is a discontinuity in a change of the value of a decoding time (or decoding time stamp), the CPU 201 can recognize the discontinuity in advance and further can clearly ascertain progress of units of access units (pictures) until the discontinuity occurs from the count-down information (count-down value). In addition, when a display time interval of each access unit (picture) is switched, the CPU 201 can recognize the switching in advance and further can clearly ascertain progress in units of access units (pictures) until the switching from the count-down information (count-down value).

In addition, the demultiplexer 203 extracts the time stamps of the DTS and PTS disposed in the PES header for each picture and supplies them to the CPU 201. The CPU 201 gives decoding timings and display timings to the decoder 205 based on the time stamps.

The decoder 205 decodes encoded image data of each of the pictures of the video stream accumulated in the compressed data buffer 204 at the decoding timings of the pictures and sends the data to the uncompressed data buffer (dpb) 206 to cause the data to be temporarily accumulated. In this case, when the encoded image data of each of the pictures is decoded, image data of a reference target picture is read from the uncompressed data buffer 206 and used if necessary.

The image data of each of the pictures sequentially read from the uncompressed data buffer (dpb) 206 at the display timings is sent to the post-processing unit 207. In this case, the display end timing of the last picture of the first sequence is set to the same timing as the display start timing of the first picture of the second sequence.

The post-processing unit 207 performs interpolation or subsampling to cause the frame rate of the image data of the pictures to match the display capability. The image data of the pictures processed by the post-processing unit 207 is supplied to the display and a dynamic image of the image data of the pictures is displayed.

It should be noted that the frequency of the vertical synchronization signal Vsync is switched as a frequency division value (divider value) supplied from the CPU 201 is changed. The frequency of the vertical synchronization signal Vsync is switched to match the frame rate of the first sequence until the display start timing of the first picture of the second sequence and to match the frame rate of the second sequence from that timing. The CPU 201 recognizes this timing of switching based on the discontinuity information that is the temporal discontinuity information and the count-down information.

In addition, the frequency of the vertical synchronization signal Vsync is set to match the frame rate of the first sequence before the display start timing of the first picture of the second sequence as above. For this reason, the encoded image data of each of the pictures of the second sequence is decoded at the decoding timings of the encoded image data of each of the pictures of the first sequence before the display start timing of the first picture of the second sequence according to control of the CPU 201. This control is possible since the discontinuity information of the temporal discontinuity information is detected.

As described above, in the transmission and reception system 10 shown in FIG. 1, the transmission side performed encoding such that the display end timing of the last picture of the encoded image data of the first sequence is set to the same timing as the display start timing of the first picture of the encoded image data of the second sequence. Thus, for example, the reception side can easily secure a display continuity between the first sequence and the second sequence.

In addition, in the transmission and reception system 10 shown in FIG. 1, the transmission side performs encoding such that the encoded image data of the first sequence and the encoded image data of the second sequence have the same number of delayed pictures after decoding until displaying. Thus, for example, the reception side can avoid a buffer failure that could occur in the switched part from the first sequence to the second sequence.

In addition, in the transmission and reception system 10 shown in FIG. 1, the transmission side inserts information indicating whether or not there is a change in a frame rate, i.e., temporal refresh information SEI (temporal_refresh_information SEI) into the encoded image data of each picture of the video stream. Thus, for example, the reception side can easily ascertain the point of the change from the first sequence to the second sequence.

In addition, in the transmission and reception system 10 shown in FIG. 1, the transmission side inserts information notifying of a change from the encoded image data of the first sequence to the encoded image data of the second sequence, i.e., temporal discontinuity information (temporal_discontinuity_information) into a packet containing the video stream, for example, a PES packet. Thus, for example, the reception side can easily ascertain the change from the first sequence to the second sequence, time information, discontinuity information of a time stamp, and count-down information until the change.

In addition, in the transmission and reception system 10 shown in FIG. 1, the transmission side inserts information notifying of a change from the encoded image data of the first sequence to the encoded image data of the second sequence, i.e., a video parameter descriptor (Video_parameter_descriptor) into a layer of a container, i.e., a layer of the transport stream TS. Thus, for example, the reception side can easily ascertain the change from the first sequence to the second sequence and the changed frame rate.

In addition, in the transmission and reception system 10 shown in FIG. 1, the reception side decodes the encoded image data of each of the pictures of the second sequence at the decoding timing of the encoded image data of each of the pictures of the first sequence before the display start timing of the first picture of the second sequence. Thus, for example, implementation in which two asynchronous vertical synchronization signals are simultaneously generated can be avoided.

<2. Modified Example>

In the above-described embodiment, the example in which the reception side can easily secure a display continuity between the first sequence and the second sequence is shown. To this end, the transmission side performs encoding such that the display end timing of the last picture of the encoded image data of the first sequence is set to the same timing as the display start timing of the first picture of the encoded image data of the second sequence.

Here, the reception side is considered to easily secure a display continuity between the first sequence and the second sequence and further easily secure continuity in decoding timings of the first sequence and the second sequence. To this end, the transmission side performs encoding such that the decoding timing of the first picture of the encoded image data of the second sequence is set at the timing obtained by adding the time interval of one picture of the encoded image data of the first sequence to the decoding timing of the last picture of the encoded image data of the first sequence.

FIG. 24 shows an example of hypothetical reference decoder (HRD) control of the encoder 102 in that case. In FIG. 24, detailed descriptions of portions corresponding to those of FIG. 3 described above are appropriately omitted.

In the illustrated example, the first sequence is composed of 4 pictures, which are decoded in the order of a0, a1, a2, and a3, and displayed in the order of a0, a2, a3, and a1. In this case, image data of each decoded picture is input to the uncompressed data buffer (decoded picture buffer or dpb). In this example, the number of delayed pictures after the first sequence is decoded until display thereof is started is set to 2.

Each of the pictures of the first sequence is decoded and displayed at a timing of the vertical synchronization signal (Vsync) having a time interval corresponding to a frame rate (frame frequency) thereof. For example, the pictures a0, a1, a2, and a3 are decoded at the timings Ta(0), Ta(1), Ta(2), and Ta(3), and display of the pictures a0, a2, a3, and a1 is started at the timings Ta(2), Ta(3), Ta(4), and Ta(5).

The second sequence is composed of 6 pictures, which are decoded in the order of b0, b1, b2, b3, b4, and b5, and displayed in the order of b1, b2, b0, b4, b5, and b3. In this case, encoded data of each of the decoded pictures is input to the dpb. In this example, the number of delayed pictures after the second sequence is decoded until display thereof is started is set to 2, the same as the first sequence. Accordingly, a buffer failure is avoided.

Like in the example of FIG. 3, the display end timing of the last picture of the encoded image data of the first sequence is set to the same timing as the display start timing of the first picture of the encoded image data of the second sequence. In other words, the timing Ta(6) is set to the same timing as the timing Tb(2). Accordingly, a display continuity between the first sequence and the second sequence is ensured.

From the display start timing (Tb(2)) of the first picture of the second sequence, the sequence is decoded and displayed at timings of the vertical synchronization signal (Vsync) having a time interval corresponding to the frame rate (frame frequency) thereof. For example, the pictures b2, b3, b4, and b5 are decoded at the timings Tb(2), Tb(3), Tb(4), and Tb(5), and display of the pictures b1, b2, b0, b4, b5, and b3 is started at the timings Tb(2), Tb(3), Tb(4), Tb(5), Tb(6), and Tb(7).

In addition, before the display start timing (Tb(2)) of the first picture thereof, the second sequence is decoded at the timings of the vertical synchronization signal (Vsync) having a time interval corresponding to the first frame rate (frame frequency). In this example, the pictures b0 and b1 are decoded at Tb(0) and Tb(1), under the setting of Tb(0)=Ta(4) and Tb(1)=Ta(5).

In this case, the decoding timing of the first picture of the encoded image data of the second sequence is set at the timing obtained by adding the time interval of one picture of the encoded image data of the first sequence to the decoding timing of the last picture of the encoded image data of the first sequence. In other words, the timing Ta(4) is set to the same timing as the timing Tb(0). Therefore, "Initial_cpb_removal_delayB" is set so that the timing Tb(0) is set to the same timing as the timing Ta(4).

By performing encoding such that the timing Tb(0) is set to the same timing as the timing Ta(4), the reception side easily secures continuity in the decoding timings of the first sequence and the second sequence, and late reading of the first picture of the second sequence is avoided. In this case, the reception side does not necessitate a process of adjusting the decoding timings of the pictures of the second sequence positioned before the display start timing of the first picture of the second sequence as described in FIGS. 22 and 23 above. Therefore, a burden of the reception side can also be reduced.

<2. Modified Example>

It should be noted that, although the above-described embodiment shows the transmission and reception system 10 constituted by the transmission device 100 and the reception device 200, a configuration of a transmission and reception system to which the present technology can be applied is not limited thereto. For example, the reception device 200 part may be configured with, for example, a set-top box connected with a digital interface such as High-Definition Multimedia Interface (HDMI) and a monitor, or the like. Note that "HDMI" is a registered trademark.

In addition, the above-described embodiment shows the example in which the container is a transport stream (MPEG-2 TS). The present technology, however, can also be similarly applied to a system configured to distribute data to a reception terminal using a network such as the Internet. In distribution on the Internet, there are many cases of distribution using a container in MP4 or other formats. In other words, as containers, various formats including transport streams (MPEG-2 TS) employed in digital broadcasting standards, MP4 used in Internet distribution, and the like are equivalent thereto.

Additionally, the present technology may also be configured as below.

(1)

An encoding device including:

an image encoding unit configured to generate video data having a switched part from encoded image data of a first sequence to encoded image data of a second sequence having a different frame rate from the first sequence, wherein the image encoding unit performs encoding in a manner that a display end timing of a last picture of the encoded image data of the first sequence is set to a same timing as a display start timing of a first picture of the encoded image data of the second sequence.

(2)

The encoding device according to (1), wherein the image encoding unit performs encoding in a manner that the encoded image data of the first sequence and the encoded image data of the second sequence have the same number of delayed pictures from decoding until display.

(3)

The encoding device according to (1) or (2), wherein the image encoding unit performs encoding in a manner that a decoding timing of the first picture of the encoded image data of the second sequence is set at a timing obtained by adding a time interval of one picture of the encoded image data of the first sequence to a decoding timing of the last picture of the encoded image data of the first sequence.

(4)

A transmission device including:

an image encoding unit configured to generate video data having a switched part from encoded image data of a first sequence to encoded image data of a second sequence having a different frame rate from the first sequence; and a transmission unit configured to transmit a container in a predetermined format which includes the generated video data, wherein the image encoding unit performs encoding in a manner that a display end timing of a last picture of the encoded image data of the first sequence is set to a same timing as a display start timing of a first picture of the encoded image data of the second sequence.

(5)

The transmission device according to (4), further including:

an information insertion unit configured to insert information indicating whether or not there is a change in a frame rate into each piece of encoded image data of each picture of the video data.

(6)

The transmission device according to (5), wherein, when the information indicates that there is a change in the frame rate, information indicating a value of a changed frame rate is added to the information.

(7)

The transmission device according to any of (4) to (6), further including:

an information insertion unit configured to insert information notifying of a change from the encoded image data of the first sequence to the encoded image data of the second sequence into a packet containing the video data.

(8)

The transmission device according to (7), wherein the notification information includes information indicating whether or not there is a discontinuity in a change of a value of a decoding time.

(9)

The transmission device according to (8), wherein, when the information indicates that there is a discontinuity, a count-down value of the number of pictures until the discontinuity occurs is added to the information.

(10)

The transmission device according to any of (7) to (9), wherein the notification information includes information indicating whether or not a display time interval of each picture is switched.

(11)

The transmission device according to (10), wherein, when the information indicates switching, a count-down value of the number of pictures until the switching is added to the information.

(12)

The transmission device according to any of (7) to (11), wherein the information insertion unit inserts the notification information into an extension field of a PES packet which includes encoded image data of each picture in a payload.

(13)

The transmission device according to any of (4) to (12), further including:

an information insertion unit configured to insert information notifying of a change from the encoded image data of the first sequence to the encoded image data of the second sequence into a layer of the container.

(14)

The transmission device according to (13), wherein the notification information includes information on a frame rate of the first sequence and a frame rate of the second sequence.

(15)

A reception device including:

a reception unit configured to receive video data having a switched part from encoded image data of a first sequence to encoded image data of a second sequence having a different frame rate from the first sequence; and a processing unit configured to process the received video data, wherein the video data is encoded in a manner that a display end timing of a last picture of the encoded image data of the first sequence is set to a same timing as a display start timing of a first picture of the encoded image data of the second sequence.

(16)

The reception device according to (15), wherein the video data is encoded in a manner that the encoded image data of the first sequence and the encoded image data of the second sequence have the same number of delayed pictures from decoding until display.

(17)

The reception device according to (15) or (16), wherein the video data is encoded in a manner that a decoding timing of the first picture of the encoded image data of the second sequence is set at a timing obtained by adding a time interval of one picture of the encoded image data of the first sequence to a decoding timing of the last picture of the encoded image data of the first sequence.

(18)

A reception device including:

a reception unit configured to receive a container in a predetermined format which includes video data having a switched part from encoded image data of a first sequence to encoded image data of a second sequence having a different frame rate from the first sequence, wherein the video data is encoded in a manner that a display end timing of a last picture of the encoded image data of the first sequence is set to a same timing as a display start timing of a first picture of the encoded image data of the second sequence, and wherein the reception device further includes an image decoding unit configured to decode the video data included in the received container to obtain image data with a display continuity between the first sequence and the second sequence maintained.

(19)

The reception device according to (18), wherein, before the same timing, the image decoding unit decodes encoded image data of each picture of the second sequence at a timing synchronized with a decoding timing of encoded image data of each picture of the first sequence.

(20)

The reception device according to (18) or (19), wherein information notifying of a change from the encoded image data of the first sequence to the encoded image data of the second sequence is inserted into at least one of a packet containing the video data and a layer of the container, and wherein a process of the image decoding unit is controlled based on the notification information.

A main characteristic of the present technology is that, when video data having a frame rate switched part is distributed, a reception side can easily secure a display continuity between a first sequence and a second sequence as encoding is performed such that the display end timing of the last picture of encoded image data of the first sequence is set to the same timing as the display start timing of the first picture of encoded image data of the second sequence (see FIG. 3).

REFERENCE SIGNS LIST 10 transmission and reception system
100 transmission device
101 CPU
102 encoder
103 compressed data buffer (cpb)
104 multiplexer
105 transmission unit
122 buffer delay control unit
123 HRD setting unit
124 parameter set/SEI encoding unit
125 slice encoding unit
126 NAL packetizing unit
142 section coding unit
143 PES packetizing unit
144 transport packetizing unit
200 reception device
201 CPU
202 reception unit
203 demultiplexer
204 compressed data buffer (cpb)
205 decoder
206 uncompressed data buffer (dpb)
207 post-processing unit
208 clock generation unit
209 frequency divider
231 TS adaptation field extraction unit
232 clock information extraction unit 233 TS payload extraction unit
234 section extraction unit
235 PSI table/descriptor extraction unit
236 PES packet extraction unit
237 PES header extraction unit
238 time stamp extraction unit
239 discontinuity/count-down information extraction unit
240 PES payload extraction unit
251 NAL packet analysis unit
252 decoding unit

The invention claimed is:

1. An encoding device comprising:
circuitry including at least a central processor and a buffer, the circuitry configured to:
generate video data having a switched part from encoded image data of a first sequence to encoded image data of a second sequence having a different frame rate from the first sequence,
wherein the circuitry performs encoding in a manner that a display end timing of a last picture of the encoded image data of the first sequence is set to a same timing as a display start timing of a first picture of the encoded image data of the second sequence, a number of delayed pictures after decoding and starting display of the first sequence is set to the same as a number of delayed pictures after decoding and starting display of the second sequence.

2. The encoding device according to claim 1, wherein the circuitry is further configured to perform encoding in a manner that a decoding timing of the first picture of the encoded image data of the second sequence is set at a timing obtained by adding a time interval of one picture of the encoded image data of the first sequence to a decoding timing of the last picture of the encoded image data of the first sequence.

3. A transmission device comprising:
circuitry including at least a central processor and a buffer, the circuitry configured to:
generate video data having a switched part from encoded image data of a first sequence to encoded image data of a second sequence having a different frame rate from the first sequence; and
transmit a container in a predetermined format which includes the generated video data,
wherein the circuitry performs encoding in a manner that a display end timing of a last picture of the encoded image data of the first sequence is set to a same timing as a display start timing of a first picture of the encoded image data of the second sequence, a number of delayed pictures after decoding and starting display of the first sequence is set to the same as a number of delayed pictures after decoding and starting display of the second sequence.

4. The transmission device according to claim 3, wherein the circuitry is further configured to insert information indicating whether or not there is a change in a frame rate into each piece of encoded image data of each picture of the video data.

5. The transmission device according to claim 4, wherein, when the information indicates that there is a change in the frame rate, information indicating a value of a changed frame rate is added to the information.

6. The transmission device according to claim 3, wherein the circuitry is further configured to insert information notifying of a change from the encoded image data of the first sequence to the encoded image data of the second sequence into a packet containing the video data.

7. The transmission device according to claim 6, wherein the inserted information includes information indicating whether or not there is a discontinuity in a change of a value of a decoding time.

8. The transmission device according to claim 7, wherein, when the information indicates that there is a discontinuity, a count-down value of a number of pictures until the discontinuity occurs is added to the information.

9. The transmission device according to claim 6, wherein the inserted information includes information indicating whether or not a display time interval of each picture is switched.

10. The transmission device according to claim 9, wherein, when the information indicates switching, a count-down value of a number of pictures until the switching is added to the information.

11. The transmission device according to claim 6, wherein the circuitry is further configured to insert the inserted information into an extension field of a packet which includes encoded image data of each picture in a payload.

12. The transmission device according to claim 3, wherein the circuitry is further configured to insert information notifying of a change from the encoded image data of the first sequence to the encoded image data of the second sequence into a layer of the container.

13. The transmission device according to claim 12, wherein the inserted information includes information on a frame rate of the first sequence and a frame rate of the second sequence.

14. A reception device comprising:
circuitry including at least a central processor and a buffer, the circuitry configured to:
receive video data having a switched part from encoded image data of a first sequence to encoded image data of a second sequence having a different frame rate from the first sequence; and
process the received video data,
wherein the video data is encoded in a manner that a display end timing of a last picture of the encoded image data of the first sequence is set to a same timing as a display start timing of a first picture of the encoded image data of the second sequence, a number of delayed pictures after decoding and starting display of the first sequence is set to the same as a number of delayed pictures after decoding and starting display of the second sequence.

15. The reception device according to claim 14, wherein the video data is encoded in a manner that a decoding timing of the first picture of the encoded image data of the second sequence is set at a timing obtained by adding a time interval of one picture of the encoded image data of the first sequence to a decoding timing of the last picture of the encoded image data of the first sequence.

16. A reception device comprising:
circuitry including at least a central processor and a buffer, the circuitry configured to:
receive a container in a predetermined format which includes video data having a switched part from encoded image data of a first sequence to encoded image data of a second sequence having a different frame rate from the first sequence, wherein the video data is encoded in a manner that a display end timing of a last picture of the encoded image data of the first sequence is set to a same timing as a display start timing of a first picture of the encoded image data of the second sequence, a number of delayed pictures after decoding and starting display of the first sequence is set to the same as a number of delayed pictures after decoding and starting display of the second sequence; and decode the video data included in the received container to obtain image data with a display continuity between the first sequence and the second sequence maintained.

17. The reception device according to claim 16, wherein, before the same timing, the circuitry is further configured to decode encoded image data of each picture of the second sequence at a timing synchronized with a decoding timing of encoded image data of each picture of the first sequence.

18. The reception device according to claim 16, wherein information notifying of a change from the encoded image data of the first sequence to the encoded image data of the second sequence is inserted into at least one of a packet containing the video data and a layer of the container, and wherein a decoding process of the circuitry is controlled based on the information notifying of the change.

\* \* \* \* \*